US007431878B2

(12) United States Patent
Yamanobe

(10) Patent No.: US 7,431,878 B2

(45) Date of Patent: *Oct. 7, 2008

(54) PROCESS OF MAKING AN ELECTRON-EMITTING DEVICE

(75) Inventor: Masato Yamanobe, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 230 days.

This patent is subject to a terminal disclaimer.

(21) Appl. No.: 10/299,659

(22) Filed: Nov. 20, 2002

(65) Prior Publication Data

US 2003/0066599 A1 Apr. 10, 2003

Related U.S. Application Data

(62) Division of application No. 09/651,565, filed on Aug. 29, 2000, now Pat. No. 6,554,946, which is a division of application No. 08/774,009, filed on Dec. 26, 1996, now Pat. No. 6,221,426.

(30) Foreign Application Priority Data

Dec. 12, 1995 (JP) .................................. 7-342153
Dec. 13, 1996 (JP) .................................. 8-334124

(51) Int. Cl.
*B05D 5/12* (2006.01)
*C01B 31/02* (2006.01)
*H01J 9/02* (2006.01)
*H05B 3/03* (2006.01)
*H05B 6/54* (2006.01)

(52) U.S. Cl. ...................... 264/447; 264/29.1; 264/134; 264/449; 264/450; 427/77; 427/228; 427/592

(58) Field of Classification Search ................ 264/29.1, 264/134, 447, 450, 446, 449; 445/6, 24, 445/50; 156/104, 285, 292, 322; 427/77, 427/227, 228, 592

See application file for complete search history.

(56) References Cited

U.S. PATENT DOCUMENTS

| | | | | |
|---|---|---|---|---|
| 4,986,943 | A * | 1/1991 | Sheaffer et al. | 264/29.1 |
| 5,322,555 | A | 6/1994 | Leung et al. | 106/18.12 |
| 5,591,061 | A * | 1/1997 | Ikeda et al. | 445/3 |
| 6,017,259 | A * | 1/2000 | Motoi et al. | 445/51 |
| 6,246,168 | B1 * | 6/2001 | Kishi et al. | 313/495 |
| 6,383,047 | B1 * | 5/2002 | Minami et al. | 445/6 |
| 6,783,414 | B2 * | 8/2004 | Minami et al. | 445/6 |

FOREIGN PATENT DOCUMENTS

EP 0658924 A1 6/1995

(Continued)

OTHER PUBLICATIONS

Dyke. W.P., et al., "Field Emission", Advances in Electronics and Electron Physics, vol. VIII (1956), pp. 89-185.

(Continued)

*Primary Examiner*—Leo B Tentoni
(74) *Attorney, Agent, or Firm*—Fitzpatrick, Cella, Harper & Scinto

(57) ABSTRACT

A method of making an electron-emitting device including the steps of (A) preparing a member comprising first and second substances composed of carbon, wherein the substances have respective reaction rates different from each other for a gas, and (B) heating the member in an atmosphere containing the gas.

6 Claims, 17 Drawing Sheets

FOREIGN PATENT DOCUMENTS

| | | | |
|---|---|---|---|
| EP | 0660357 | A1 | 6/1995 |
| EP | 0693766 | A1 | 1/1996 |
| EP | 0696813 | A1 | 2/1996 |
| EP | 0701265 | A1 | 3/1996 |
| EP | 0715329 | A1 | 6/1996 |
| EP | 0736890 | A1 | 10/1996 |
| EP | 0736892 | A1 | 10/1996 |
| EP | 0740324 | A2 | 10/1996 |
| EP | 0757371 | A1 | 2/1997 |
| JP | 1-309242 | A | 12/1989 |
| JP | 3-170828 | A | 7/1991 |
| JP | 7 235255 | A | 9/1995 |
| JP | 2-769002 | B2 | 4/1998 |

OTHER PUBLICATIONS

Spindt, C.A., et al., "Physical Properties of Thin-Film Field Emission Cathodes with Molybdenum Cones", Journal of Applied Physics vol. 47, No. 12, pp. 5248-5263 (Dec. 1976).

Mead, C.A., "Operation of Tunnel-Emission Devices", 37 Journal of Applied Physics 646, vol. 32, No. 4, pp. 646-652 (Apr. 1961).

Elinson, M.L., et al., "The Emission of Hot Electrons and the Field Emission of Electrons From Tin Oxide", Radio Engineering and Electronic Physics, pp. 1290-1295, Jul. 1965.

Dittmer, G., "Electrical Conduction and Electron Emission of Discontinuous Thin Films", 9 Thin Solid Films pp. 317-328 (1972).

Hartwell, M., et al., "Strong Electron Emission from Patterned Tinindium Oxide Thin Films", International Electron Devices Meeting pp. 519-521(1975).

Araki, H., et al., "Electroforming and Electron Emission of Carbon Thin Films", Journal of the Vacuum Society of Japan, vol. 26, No. 1, pp. 22-29 (1981).

* cited by examiner

PROCESS OF MAKING AN ELECTRON-EMITTING DEVICE

This application is a division of application Ser. No. 09/651,565, filed Aug. 29, 2000, now U.S. Pat. No. 6,554, 946, issued Apr. 29, 2003, which is a division of application Ser. No. 08/774,009, filed Dec. 26, 1996, now U.S. Pat. No. 6,221,426, issued Apr.24, 2001.

BACKGROUND OF THE INVENTION

1. Field of the Invention

This invention relates to a method of manufacturing an electron-emitting device and a method of manufacturing an electron source and image-forming apparatus, using such a method. It also relates to apparatuses to be used for such methods.

2. Related Background Art

There have been known two types of electron-emitting device; the thermoelectron emission type and the cold cathode electron emission type. Of these, the cold cathode emission type refers to devices including field emission type (hereinafter referred to as the FE type) devices, metal/insulation layer/metal type (hereinafter referred to as the MIM type) electron-emitting devices and surface conduction electron-emitting devices.

Examples of FE type device include those proposed by W. P. Dyke & W. W. Dolan, "Field emission", Advance in Electron Physics, 8, 89 (1956) and C. A. Spindt, "PHYSICAL Properties of thin-film field emission cathodes with molybdenum cones", J. Appl. Phys., 47, 5248 (1976).

Examples of MIM device are disclosed in papers including C. A. Mead, "Operation of Tunnel-Emission Devices", J. Appl. Phys., 32, 646 (1961).

Examples of surface conduction electron-emitting device include one proposed by M. I. Elinson, Radio Eng. Electron Phys., 10, 1290 (1965).

A surface conduction electron-emitting device is realized by utilizing the phenomenon that electrons are emitted out of a small thin film formed on a substrate when an electric current is forced to flow in parallel with the film surface. While Elinson et al. proposes the use of $SnO_2$ thin film for a device of this type, the use of Au thin film is proposed in G. Dittmer: "Thin Solid Films", 9, 317 (1972) whereas the use of $In_2O_3/SnO_2$ thin film and that of carbon thin film are discussed respectively in M. Hartwell and C. G. Fonstad: "IEEE Trans. ED Conf.", 519 (1975) and H. Araki et al.: "Vacuum", Vol. 26, No. 1, p. 22 (1983).

FIG. 20 of the accompanying drawings schematically illustrates a typical surface conduction electron-emitting device proposed by M. Hartwell.

In FIG. 20, reference numeral 1 denotes a substrate and 2 and 3 denote device electrodes. Reference numeral 4 denotes an electroconductive film normally prepared by producing an H-shaped thin metal oxide film by means of sputtering, part of which is subsequently turned into an electron-emitting region when it is subjected to a process of current conduction treatment referred to as "energization forming" as described hereinafter. In FIG. 20, a pair of device electrodes are separated from each other by a distance L of 0.5 to 1 mm and the central area of the electroconductive film has a width W' of 0.1 mm.

Conventionally, an electron emitting region 5 is produced in a surface conduction electron-emitting device by subjecting the electroconductive film 4 of the device to a current conduction treatment which is referred to as "energization forming". In an energization forming process, a constant DC voltage or a slowly rising DC voltage that rises typically at a rate of 1V/min. is applied to given opposite ends of the electroconductive film 4 to partly destroy, deform or transform the film and produce an electron-emitting region 5 which is electrically highly resistive.

Thus, the electron-emitting region 5 is part of the electroconductive film 4 that typically contains a fissure or fissures therein so that electrons may be emitted from the fissure. Note that, once subjected to an energization forming process, a surface conduction electron-emitting device comes to emit electrons from its electron emitting region 5 whenever an appropriate voltage is applied to the electroconductive film 4 to make an electric current run through the device.

The applicant of the present patent application has proposed a method of manufacturing a surface conduction electron-emitting device having remarkably improved electron-emitting characteristics by forming carbon and/or a carbon compound in an electron-emitting region of the electron-emitting device by means of a novel technique referred to as activation process. (Japanese Patent Application Laid-Open No. 7-235255.) The activation process is carried out after the energization forming process. In the activation process, the device is placed in a vacuum vessel, an organic gas containing at least carbon, i.e. an element commonly found in the deposit to be formed on the electron-emitting region in the energization forming step, is introduced into the vacuum vessel and an appropriately selected pulse-shaped voltage is applied to the device electrodes for several to tens of several minutes. As a result of this step, the electron-emitting performance of the electron-emitting device is remarkably improved, that is the emission current Ie of the device is significantly increased while showing a threshold value relative to the voltage.

Apart from the electron-emitting device, carbonization in a gas, liquid or solid phase is a well known technique for preparing carbonic materials. For carbonization in a gas phase, hydrocarbon gas such as methane, propane or benzene is introduced into a high temperature zone of a processing system and pyrolyzed in a gas phase to produce carbon black, graphite or carbon fiber. As for carbonization in a solid phase, it is known that glassy carbon can be produced from thermosetting resins such as phenol resin and furan resin, cellulose or vinylidene polychloride (M. Inagaki: "Carbonic Material Engineering", Nikkan Kogyo Shinbunsha, pp.50-80).

However, an activation process is more often than not accompanied by the following problems.

Problem 1: For introducing gas in an activation process, an optimum gas pressure has to be selected and maintained for the gas although it can be too low to be held under control depending on the type of the gas to be used. Additionally, the time required for the activation process can vary significantly or the properties of the substance deposited on the electron-emitting region can be modified remarkably due to the water, hydrogen, oxygen, CO and/or $CO_2$ existing in the atmosphere of the vacuum chamber if a very low pressure classified as vacuum is used. This problem by turn can give rise to deviations in the performance of the electron-emitting devices of an electron source realized by arranging a large number of electron-emitting devices or an image-forming apparatus incorporating such an electron source. Particularly, in the case of a large electron source comprising an electron source substrate carrying thereon a large number of paired device electrodes, pieces of electroconductive film and wires connecting the electrodes, a face plate typically provided with a set of fluorescent bodies is arranged vis-a-vis the substrate with spacers disposed between the electron source substrate and the face plate to separate them by a distance less than several millimeters and bonded together at high temperature to form a vacuum envelope (referred to as sealing). When a voltage is subsequently applied to the wires of the electrode pairs for energization forming and activation, there arises a problem that it takes a long time for introducing gas and making a constant gas pressure prevail within the envelope in order to compensate the low conductance of the vacuum envelope for gas due to the minute distance between the electron source substrate and the face plate. Thus, there is a demand for a new process that can replace the known activation process using gas. According to a method for producing glassy carbon from cellulose or thermosetting resin proposed in response to this demand, powdery cellulose is dispersed into water, molded by mean of centrifugal force applied thereto, dried, thereafter baked at 500° C. under a pressure of 140 kg/cm$^2$ and then heated further at 1,300 to 3,000° C. under atmospheric pressure to produce glassy carbon. When cellulose is pyrolyzed, the molded pyrolytic product contains porosities therein, which are then reduced to become negligible as it is heated to above 1,500° C. (M. Inagaki: "Carbonic Material Engineering", Nikkan Kogyo Shinbunsha, pp.50-80). However, this remarkable phenomenon cannot be applied directly to the activation process of manufacturing a surface conduction electron-emitting device because of the very high temperature and pressure involved. More specifically, as will be described hereinafter, the electroconductive film of the electron-emitting device is made of fine particles and can become agglomerate to lose, totally in some cases, its electric conductivity (because the agglomerated masses of the electroconductive film are electrically isolated to increase the electric resistance of the film) or the electron-emitting region of the electroconductive film can become covered with carbon produced by pyrolysis when the film is heated to high temperature to increase the device current and hence the consumption rate of electricity of the image-forming apparatus formed by arranging a large number of such electron-emitting devices.

Problem 2: After the activation process, the gas used for the process, water and other gaseous substances such as oxygen, CO, $CO_2$ and/or hydrogen are adsorbed by the components of the image-forming apparatus including the face plate carrying thereon a set of fluorescent bodies and the adsorbed gas has to be removed in order to make the apparatus operate stably for electron emission and prevent electric discharges by the residual gas from taking place in the apparatus. While a stabilization process is normally carried out for removing the adsorbed gas by baking the components in vacuum for a long time at high temperature, such a process has not satisfactorily been able to stabilize the operation of an image-forming apparatus to date mainly because the temperature that can be used for the stabilization process is subjected to limitations depending on the thermal resistance of the components of the electron-emitting devices of an electron source or an image-forming apparatus incorporating such an electron source.

Problem 3: Conventionally, an image-forming apparatus is produced by arranging an electron source substrate carrying thereon a large number of paired device electrodes, pieces of electroconductive film and wires connecting the electrodes and a face plate typically provided with a set of fluorescent bodies oppositely relative to each other, bonding them together at high temperature to form a vacuum envelope (a step referred to as sealing process), subjecting them to a series of process including an energization forming process and an activation process by applying a voltage to the wires and then testing the electron-emitting and image-forming performance of the apparatus before hermetically sealing the vacuum envelope. Thus, since a number of steps for assembling the image-forming apparatus are conducted after the sealing process, if the electron source substrate is found defective for some reason, the entire image-forming apparatus has to be rejected as a defective product to consequently raise the average cost of manufacturing image-forming apparatuses.

In view of the above identified problems, there has been a strong demand for a novel method of manufacturing an image-forming apparatus and a manufacturing apparatus to be used with such a method, with which the image-forming apparatus is free from the above problems and can get rid of recontamination due to readsorption of water and gaseous substances including oxygen, hydrogen, CO and $CO_2$ by the degased component.

SUMMARY OF THE INVENTION

It is therefore an object of the present invention to provide a method of manufacturing an electron-emitting device that operates excellently and stably for electron emission.

Another object of the invention is to provide a method of manufacturing an electron source and an image-forming apparatus comprising a large number of electron-emitting devices that operate evenly and stably for electron emission with a minimized level of deviation in the electron-emitting performance.

Still another object of the invention is to provide a method of manufacturing an electron-emitting device having an improved activation process for improving and further stabilizing the electron-emitting performance of the device as well as a method of manufacturing an electron source and an image-forming apparatus comprising a large number of such electron-emitting devices that operate evenly and stably for electron emission with a minimized level of deviation in the electron-emitting performance.

Still another object of the invention is to provide a method of manufacturing an electron-emitting device having a simplified activation process for improving the electron-emitting performance of the device that does not require complicated process control as well as a method of manufacturing an electron source and an image-forming apparatus comprising a large number of such electron-emitting devices.

A further object of the invention is to provide a method of manufacturing an electron-emitting device that does not require any heat treatment at very high temperature as well as a method of manufacturing an electron source and an image-forming apparatus comprising a large number of such electron-emitting devices.

A further object of the invention is to provide a method of manufacturing an electron-emitting device whose activation process for improving the electron-emitting performance of the device and stabilization process for stabilizing the electron-emitting performance and preventing electric discharges of the device doe not require any heat treatment at high temperature as well as a method of manufacturing an electron source and an image-forming apparatus comprising such electron-emitting devices.

A still further object of the invention is to provide an apparatus for manufacturing image-forming apparatus at an improved yield.

According to the invention, the above objects are achieved by providing a method of manufacturing an electron-emitting device comprising an electroconductive film including an electron-emitting region and a pair of device electrodes for applying a voltage to the electroconductive film, characterized in that the electron-emitting region is formed by steps of applying a film of an organic substance to the electroconductive film, carbonizing the organic substance at least by electrically energizing the electroconductive film and forming a fissure or fissures in the electroconconductive film prior to the carbonization step.

According to the invention, there is provided a method of manufacturing an electron source comprising a plurality of electron-emitting devices, characterized in that the electron-emitting devices are manufactured by the above method.

According to the invention, there is provided a method of manufacturing an image-forming apparatus comprising an envelope, an electron source arranged in the envelope and having a plurality of electron-emitting devices and an image-forming member for forming an image when irradiated by electrons emitted from the electron source, characterized in that the electron-emitting devices are manufactured by the above method.

According to the invention, there is provided a method of manufacturing an electron-emitting device comprising an electroconductive film including an electron-emitting region and a pair of device electrodes for applying a voltage to the electroconductive film, characterized in that it comprises steps of forming an electron-emitting region including applying a film of an organic substance to the electroconductive film, carbonizing the organic substance at least by electrically energizing the electroconductive film and forming a fissure or fissures in the electroconductive film prior to the carbonization step, and heating the electron-emitting device in an atmosphere containing a reactive gas.

According to the invention, there is provided a method of manufacturing an electron source comprising a plurality of electron-emitting devices, characterized in that the electron-emitting devices are manufactured by the above method.

According to the invention, there is provided a method of manufacturing an image-forming apparatus comprising an envelope, an electron source arranged in the envelope and having a plurality of electron-emitting devices and an image-forming member for forming an image when irradiated by electrons emitted from the electron source, characterized in that the electron-emitting devices are manufactured by the above method.

According to the invention, there is provided a manufacturing apparatus for realizing the above methods of manufacturing an image-forming apparatus.

DESCRIPTION OF THE PREFERRED EMBODIMENTS

Figure 1A:
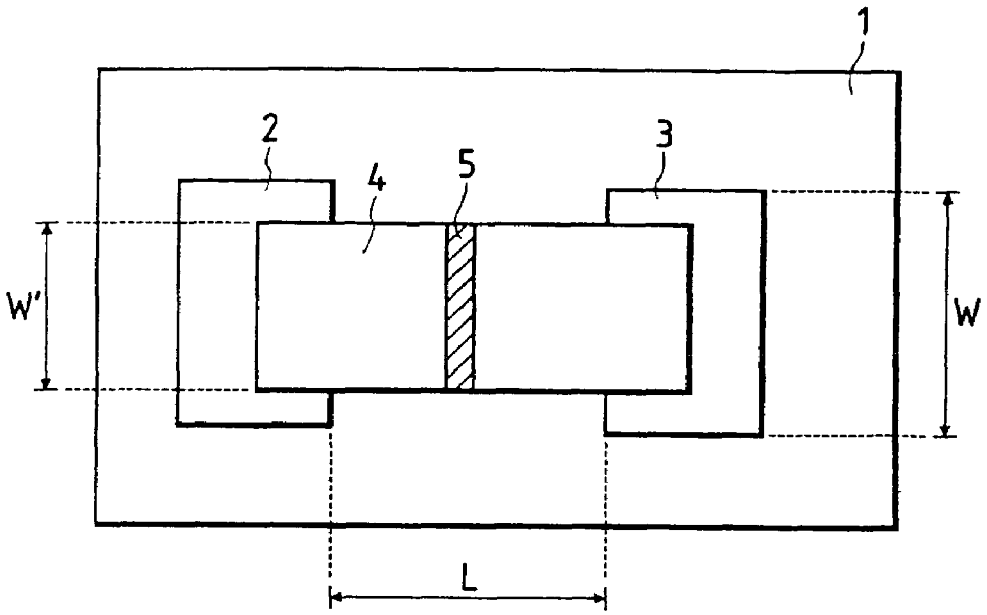
FIGS. 1A and 1B are a plan view (1A) and a sectional side view (1B) schematically illustrating a surface conduction electron-emitting device according to the invention.

With any known conventional methods of manufacturing an electron-emitting device comprising an activation process, gas has to be introduced into a vacuum chamber under appropriate pressure in a vacuum chamber under appropriate pressure in a controlled manner. To the contrary, according to a method of manufacturing an electron-emitting device of the present invention, the activation process includes steps of applying a film of an organic substance to the electroconductive film and carbonizing the organic substance. For applying an organic substance, thermosetting resins or electron beam resists are dissolved as the organic substance in an appropriate solvent to form a semi-polymerized product, which is then applied to the electroconductive film in the step of applying an organic substance of the activation process, so that no gas has to be introduced in a rigorously controlled manner to alleviate the problem of the influence of the residual gas in the vacuum system and hence the rigorous pressure control operation of the conventional activation process is eliminated to facilitate the control of the process. Additionally, since the organic substance is applied to the electroconductive film to form a deposited material and practically does not give rise to any additional gas pressure, heat can be used in the activation process without restriction to reduce the entire time span of the process.

Furthermore, the carbonization step of the activation process involves an operation of electric energization or that of both electric energization and heating and hence the obtained carbonized product can be deposited to the electron-emitting region without difficulty by controlling the time for transforming the organic substance, the amount of energy used in the step (in terms of the temperature when heat is used and the voltage and the pulse width of the pulse voltage applied to the device electrodes when electricity is used) and the thickness of application of the organic substance. Further, since the organic substance is carbonized primarily by the energy induced by current conduction, fissures in the electron emitting region are maintained, whereby nonlinear characteristics of emission current with reference to device voltage is maintained. Also, nonlinear characteristic of device current is maintained and accordingly, power consumtion is not increased. High quality carbon can be readily formed for the electroconductive film by selecting an appropriate catalytic metal for the carbonizing reaction. No agglomeration spreads over the electroconductive film because energy is applied locally by means of heat and/or electron beams so that a good electric conductivity is maintained.

Thus, this novel activation process provides an excellent controllability as compared with any conventional activation process so that an electron source or an image-forming apparatus comprising a plurality of such electron-emitting devices operates satisfactorily without showing any noticeable deviations in the electron-emitting performance of the devices.

According to the invention, a stabilization process of heating the device in the presence of reactive gas directly follows the activation process to exploit the difference in the ability of withstanding the reactive gas between the intermediary product (i.e. formed in the course of carbonization) and the carbonized product (i.e. graphite or glassy carbon as a final product) that appears in the activation process so that the intermediary-product can be removed in a very short period of time without adversely affecting the performance of the surface conduction electron-emitting device that has remarkably been improved by the activation process to eliminate the problems of the existing stabilization process as listed earlier and produce an electron-emitting device that operates stably for electron emission and is suppressed in electric discharge. If the stabilization process is conducted simultaneously with the sealing process, the duration of time for thermally treating the device will be further reduced.

According to a method of manufacturing an image-forming apparatus comprising steps of preparing an electron source substrate, testing the substrate, preparing a face plate, testing the plate and assembling the electron source substrate and the face place having an image-forming member into a vacuum envelope, the cost of manufacturing the image-forming apparatus can be reduced because it can be assembled from a good electron source and a good face plate that have passed the respective tests.

Additionally, since the intermediary product produced in the activation process has been removed from the electron source substrate, the step of sealing the assembled electron source substrate and the face plate carrying thereon a set of fluorescent bodies is dedicated to removing water, oxygen, CO, $CO_2$ and hydrogen to make the entire process simpler and easier for producing a stably operating image-forming apparatus.

If an apparatus for manufacturing an image-forming apparatus by means of a method according to the invention is designed to preclude the ambient air in every step in order to prevent water, oxygen, hydrogen, CO and $CO_2$ from being adsorbed again, in particular if fabrication of an electron source and bonding of the electron source with an face plate are conducted successively under vacuum, then image-forming apparatus can be manufactured at a high yield on a stable basis.

In short, the present invention consists in providing a novel activation process for an surface conduction electron-emitting device and an electron source comprising a plurality of surface conduction electron-emitting devices and a novel process for stabilizing the performance of such electron-emitting devices.

Now, the basic configuration of a surface conduction electron-emitting device manufactured by a method according to the invention will be described.

Figure 1B:
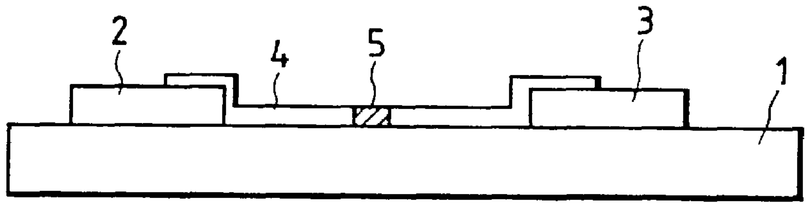

FIGS. 1A and 1B are a schematic plan view and a schematic cross sectional view of a surface conduction electron-emitting device according to the invention, of which FIG. 1A is a plan view and FIG. 1B is a sectional view.

Referring to FIGS. 1A and 1B, the device comprises a substrate 1 and a pair of device electrodes 2 and 3. Note that terms of high potential side and low potential side are frequently used, referring respectively to the device electrode 2 to which a low potential is applied, including the part of the electroconductive film starting from the electron-emitting region and located close to the device electrode 2 and the device electrode 3 to which a high potential is applied, including the part of the electroconductive film starting from the electron-emitting region and located close to the device electrode. The electron-emitting device additionally comprises an electroconductive film 4 and an electron-emitting region 5.

Materials that can be used for the substrate 1 include quartz glass, glass containing impurities such as Na to a reduced concentration level, soda lime glass, glass substrate realized by forming an $SiO_2$ layer on soda lime glass by means of sputtering, ceramic substances such as alumina as well as Si.

While the oppositely arranged lower and higher potential side device electrodes 2 and 3 may be made of any highly conducting material, preferred candidate materials include metals such as Ni, Cr, Au, Mo, W, Pt, Ti, Al, Cu and Pd and their alloys, printable conducting materials made of a metal or a metal oxide selected from Pd, Ag, $RuO_2$, Pd—Ag and glass, transparent conducting materials such as $In_2O_3$—$SnO_2$ and semiconductor materials such as polysilicon.

The distance L separating the device electrodes, the length W of the device electrodes, the width W of the electroconductive film 4, the contour of the electroconductive film 4 and other factors for designing a surface conduction electron-emitting device according to the invention may be determined depending on the application of the device. The distance L separating the device electrodes is preferably between hundreds nanometers and hundreds micrometers and, still preferably, between several micrometers and tens of several micrometers.

The length W of the device electrodes is preferably between several micrometers and hundreds of several micrometers depending on the resistance of the electrodes and the electron-emitting characteristics of the device.

The film thickness d of the device electrodes 2 and 3 is between tens of several nanometers and several micrometers.

A surface conduction electron-emitting device according to the invention may have a configuration other than the one illustrated in FIGS. 1A and 1B and, alternatively, it may be prepared by sequentially laying an electroconductive film 4 and oppositely disposed device electrodes 2 and 3 on a substrate 1.

The electroconductive film 4 is preferably made of fine particles in order to provide excellent electron-emitting characteristics.

The thickness of the electroconductive film 4 is determined as a function of the stepped coverage of the electroconductive film on the device electrodes 2 and 3, the electric resistance between the device electrodes 2 and 3 and the parameters for the forming operation that will be described later as well as other factors and preferably between hundreds of several picometers and hundreds of several nanometers and more preferably between a nanometer and fifty nanometers.

The electroconductive film 4 normally shows a sheet resistance Rs between $10^2$ and $10^7$ Ω/□. Note that Rs is the resistance defined by R=Rs(l/w), where t, w and l are the thickness, the width and the length of a thin film respectively and R is the resistance determined along the longitudinal direction of the thin film.

Note that, while the energization forming operation is described in terms of current conduction treatment here, the energization forming operation is not limited thereto and any operation that can produce one or more than one fissures in the electroconductive film to give rise to a region showing a high electric resistance may suitably be used for the purpose of the invention.

For the purpose of the invention, the electroconductive film 4 is preferably made of a material selected from metals such as Pd, Pt, Ru, Ag, Au, Ti, In, Cu, Cr, Fe, Ni, Zn, Sn, Ta, W and Pb, metal oxides such as PdO, $SnO_2$, $In_2O_3$, PbO and $Sb_2O_3$, metal borides such as $HfB_2$, $ZrB_2$, $LaB_6$, $CeB_6$, $YB_4$ and $GdB_4$, carbides such as TiC, ZrC, HfC, TaC, SiC and WC, nitrides such as TiN, ZrN and HfN, semiconductors such as Si and Ge and carbon, of which catalytic metals of the plutinum group such as Pd and Pt and metals of the iron group such as Ni and Co are preferable for forming high quality carbon without difficulty.

The term a "fine particle film" as used herein refers to a thin film constituted of a large number of fine particles that may be loosely dispersed, tightly arranged or mutually and randomly overlapping (to form an island structure under certain conditions). The diameter of fine particles to be used for the purpose of the present invention is between hundreds of several picometers and hundreds of several nanometers and preferably between a nanometer and twenty nanometers.

Since the term "fine particle" is frequently used herein, it will be described in greater depth below.

A small particle is referred to as a "fine particle" and a particle smaller than a fine particle is referred to as an "ultrafine particle". A particle smaller than an "ultrafine particle" and constituted by several hundred atoms is referred to as a "cluster".

However, these definitions are not rigorous and the scope of each term can vary depending on the particular aspect of the particle to be dealt with. An "ultrafine particle" may be referred to simply as a "fine particle" as in the case of this patent application.

"The Experimental Physics Course No. 14: Surface/Fine Particle" (ed., Koreo Kinoshita; Kyoritu Publication, Sep. 1, 1986) describes as follows.

"A fine particle as used herein refers to a particle having a diameter somewhere between 2 to 3 μm and 10 nm and an ultrafine particle as used herein means a particle having a diameter somewhere between 10 nm and 2 to 3 nm. However, these definitions are by no means rigorous and an ultrafine particle may also be referred to simply as a fine particle. Therefore, these definitions are a rule of thumb in any means. A particle constituted of two to several hundred atoms is called a cluster." (Ibid., p.195, 11.22-26)

Additionally, "Hayashi's Ultrafine Particle Project" of the New Technology Development Corporation defines an "ultrafine particle" as follows, employing a smaller lower limit for the particle size.

"The Ultrafine Particle Project (1981-1986) under the Creative Science and Technology Promoting Scheme defines an ultrafine particle as a particle having a diameter between about 1 and 100 nm. This means an ultrafine particle is an agglomerate of about 100 to $10^8$ atoms. From the viewpoint of atom, an ultrafine particle is a huge or ultrahuge particle." (Ultrafine Particle—Creative Science and Technology: ed., Chikara Hayashi, Ryoji Ueda, Akira Tazaki; Mita Publication, 1988, p.2, 11.1-4) "A particle smaller than an ultrafine particle and constituted by several to several hundred atoms is referred to as a cluster." (Ibid., p.2, 11.12-13)

Taking the above general definitions into consideration, the term "a fine particle" as used herein refers to an agglomerate of a large number of atoms and/or molecules having a diameter with a lower limit between hundreds of several picometers and one nanometer and an upper limit of several micrometers.

The electron-emitting region 5 is formed in part of the electroconductive film 4 and comprises a fissure or fissures and a neighboring area that are electrically highly resistive, although the electron-emitting performance is dependent on the thickness, the quality and the material of the electroconductive film 4 and the energization forming and activation processes which will be described hereinafter. Then, a new fissure composed of a carbon film layer is formed in the fissure produced by energization forming. Thus, the produced electron-emitting device is a non-linear device whose emission current non-linearly depends on the voltage applied to the device. Note that a carbon film deposit may be formed as well on areas of the electroconductive film other than the fissure depending on the profile of the device and the activation and stabilization processes selected for manufacturing the device. However, such areas of the electroconductive film covered by carbon film are reduced when a stabilization process is satisfactorily carried out to suggest that an intermediary product is formed as well as carbon during activation. Fine electroconductive particles with a diameter between hundreds of several picometers and tens of several nanometers may be found in the inside of the fissure where a carbon film deposit is produced. Such electroconductive fine particles contain all or part of the elements of the electroconductive film 4 along with carbon.

Now, a method of manufacturing an electron-emitting device according to the invention will be summarily described.

Figure 2:
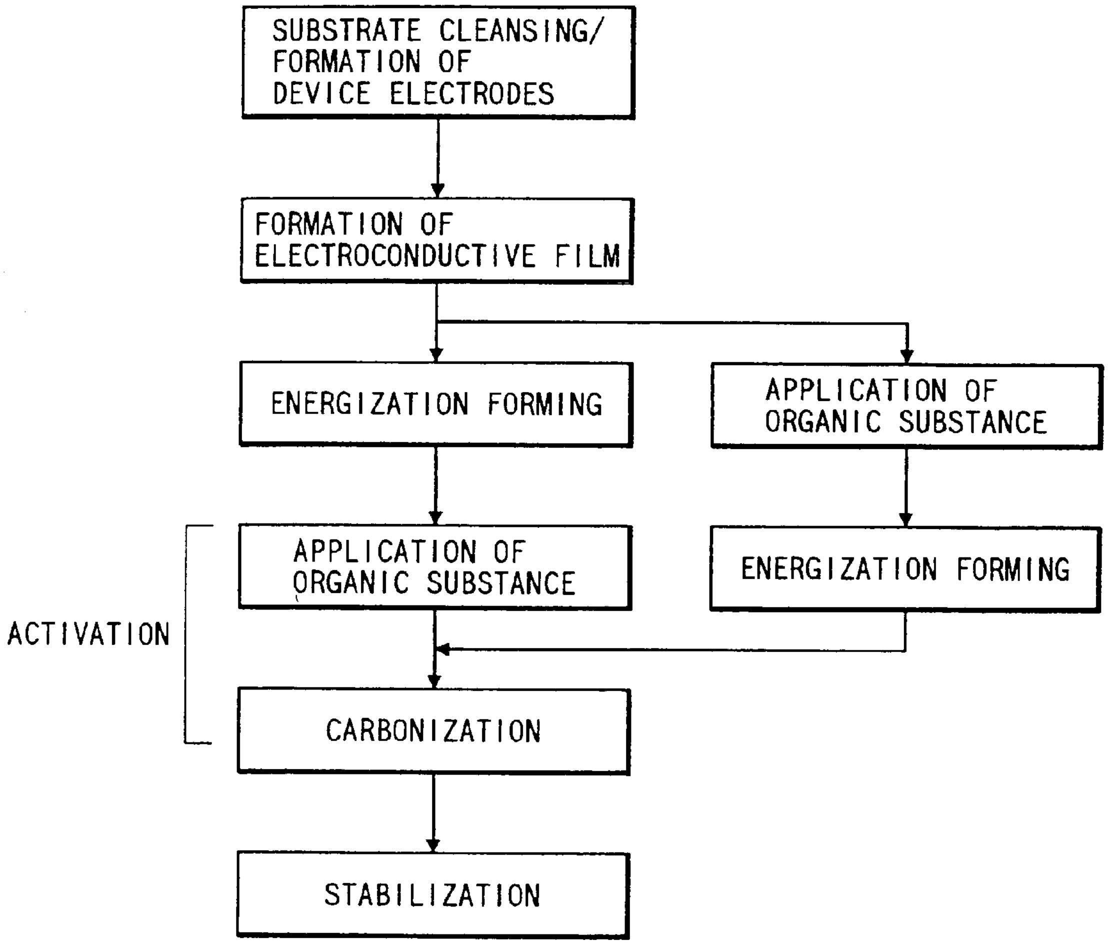
FIG. 2 is a flow chart illustrating a method of manufacturing a surface conduction electron-emitting device according to the invention.

FIG. 2 is a flow chart of the manufacturing method. A more detailed description will be made hereinafter by way of examples.

According to the invention, an activation process is carried out by applying an organic substance to the device before or after the energization forming operation conducted on the electroconductive film and further conducting an electric current through the device after the energization forming operation, while heating or not heating the device locally or totally, in order to polymerize and carbonize the organic substance and improve the electron-emitting performance of the device. Since the device is electrically energized for the activation process after carrying out an energization forming process for producing a fissure, the electric field will be centered around the fissure of the electroconductive film produced in the energization forming process and the applied electric energy will be concentrated to the ends of the fissure to easily carbonize the applied organic substance so that a new fissure composed of carbon film will be formed within the fissure of the electroconductive film to correspond to the applied electric energy.

The organic substance to be used for the purpose of the invention is preferably thermosetting resin or electron beam negative resist.

Materials that can be used as thermosetting resin for the purpose of the invention firstly include semi-polymerized materials obtained by dissolving substances such as furfuryl alcohol, furan resin and phenol resin into appropriate respective solvents. These materials are known to produce glassy carbon when thermally treated. Glassy carbon generally refers to carbon having a randomly arranged multilayer structure and a non-oriented fine texture with small crystalline dimensions, a high rigidity and a high density. These properties of glassy carbon are advantageous for surface conduction electron-emitting devices in terms of service life and electric discharge.

Secondly, such materials also include polyacrylnitrile and rayon. Polyacrylnitrile is advantageously used because its molecular skeleton is transferred to the carbon surface in the carbonization process to produce graphite without any difficulty. Rayon can also advantageously be used for a surface conduction electron-emitting device according to the invention.

Materials that can be used as electron beam negative resist include glycidyl methacrylate-ethyl acrylate copolymer, diaryl polyphthalate, glycidyl acrylate-styrene copolymer, polyimide type varnish, epoxidated 1,4-polybutadiene and glycidyl polymethacrylate, of which glycidyl methacrylate-ethyl acrylate copolymer and epoxidated 1,4-polybutadiene are advantageously used because of their excellent sensitivity as negative resist.

Electron beam negative resist is particularly advantageous for the carbonization process as will be described hereinafter because it can easily be activated by electron beams. Even if the stabilization process is not carried out satisfactorily, the electron beam negative resist is advantageously polymerized and carbonized by electron beams to effectively prevent electric discharges from occurring.

Figure 3A:
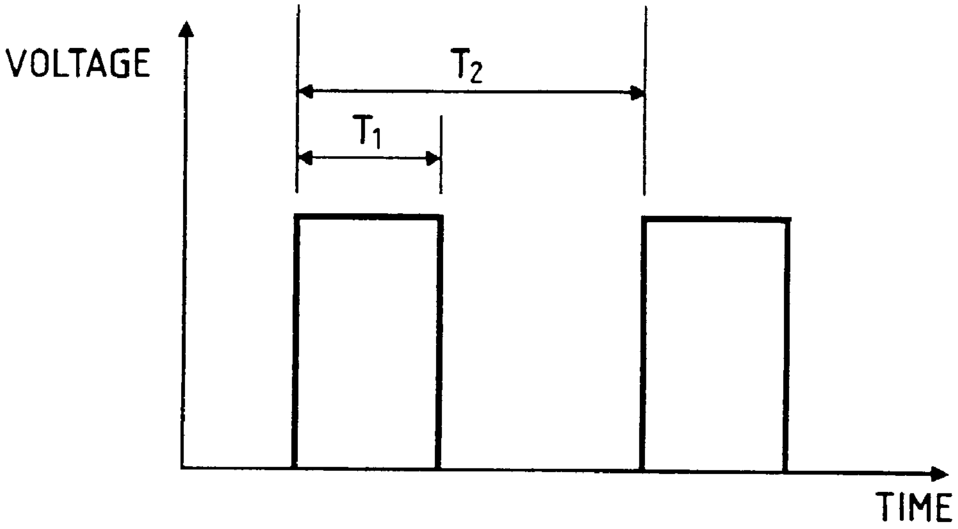
FIGS. 3A and 3B are graphs illustrating the waveforms of two different voltage pulses that can be used for the energization forming step in a method of manufacturing a surface conduction electron-emitting device according to the invention.
Figure 3B:
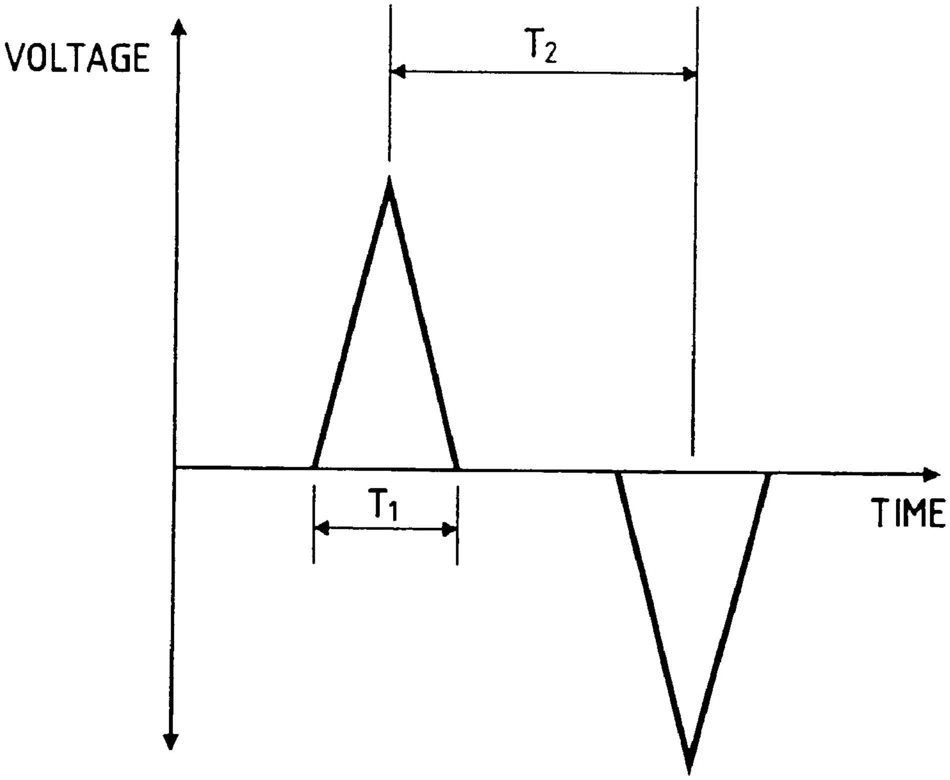

The organic substance is polymerized and carbonized typically by applying a pulse-shaped voltage as shown in FIG. 3A or 3B repeatedly. In other words, a rectangular pulse voltage as shown in FIG. 3A may be used or, alternatively, a triangular pulse voltage may be applied to the device electrodes 2 and 3 by alternately changing the polarity as shown in FIG. 3B. The pulse width T1, the pulse period T2 and the wave height of the pulse voltage may be selected appropriately depending on the amount of heat or that of electron beam energy required for the polymerization and carbonization process, preferably above the wave height of the pulse voltage for energization forming operation. The duration of time of electric energization is determined by observing the easily measurable device current and seeing the progress of the activation process. The waveform of the pulse voltage being applied to the device may be modified in the course of the activation process. The carbon formation is dependent on the direction of the electric current running through the device and carbon is mainly deposited on the high potential side. Therefore, the direction of the electric current may be alternated to avoid the directional dependency of the carbon deposit within the fissure of the electroconductive film.

The above described electric energization may be accompanied by an operation of heating either the electron-emitting region and its vicinity by means of laser or the entire electron-emitting device in a thermostatic bath, belt furnace or infrared oven. The heating temperature may be selected as a function of the organic material and regulated by means of the power level and the pulse time if laser is used. Note that, if the carbonization process is carried out by means of both electric power and externally supplied heat, the power supply rate of the process may be considerably lower than the process carried out only by electric power. It may be needless to say that, since the organic material to be used for the purpose of the invention is not gas but a solid semi-polymerized material, the rate of activation is accelerated when heated unlike the conventional process using a gaseous organic substance, where the rate of activation is decelerated by heat. This fact may suggest that the (adsorbed or applied) organic substance is carbonized predominantly in the fissure and its vicinity in the activation process and hence the adsorption of the organic substance in the fissure and its vicinity is suppressed and the rate of activation is reduced if the organic substance is gas and externally heated. The rate of activation is defined by the time for the device current or the emission current to a predetermined level. Therefore, the time duration of activation will be prolonged if the rate of activation is small, whereas it may advantageously be shortened if the rate of activation is large.

Figure 4:
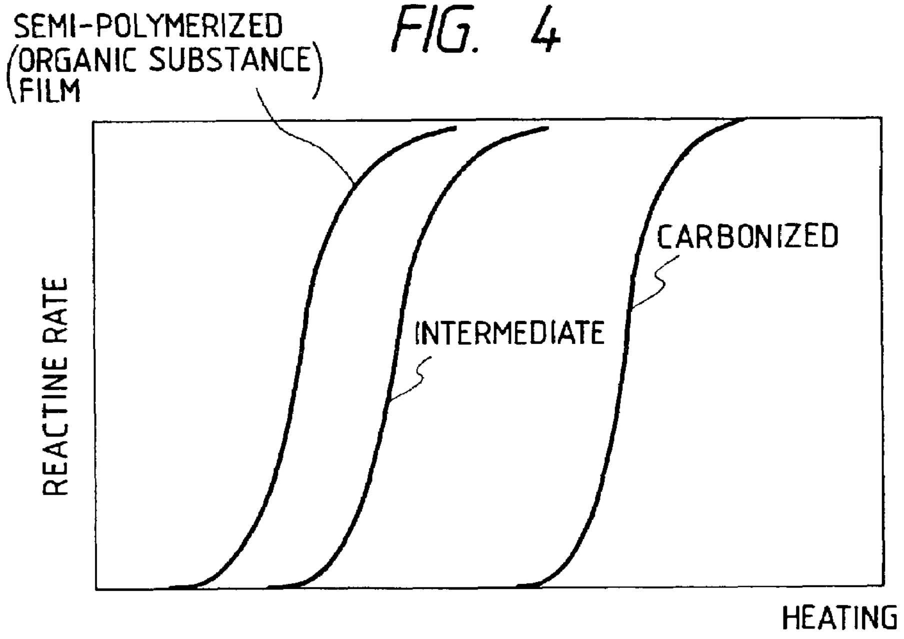
FIG. 4 is a graph showing the principle of the stabilization step in a method of manufacturing a surface conduction electron-emitting device according to the invention, illustrating the relationship between the temperature and the rate of reaction of an organic substance, an intermediary product thereof and a carbonized product thereof.

The stabilization process in a method of manufacturing an electron-emitting device according to the invention utilizes the difference in the ability of withstanding the process between the intermediary product and the final product of the activation process as described earlier. FIG. 4 of the accompanying drawings schematically illustrates the ability of the intermediary product and that the carbonized product of withstanding reactive gas. In the graph of FIG. 4, the horizontal and vertical axes indicate respectively the heating temperature and the reaction rate. Note that a same reactive gas is used and all the gas components are introduced under given respective partial pressures. The reaction rate is the rate at which the organic substance reacts with the reactive gas and removed from the reaction system. It will be seen from the graph that the semi-polymerized product (organic substance film) reacts firstly and is removed at lowest temperature, followed by the intermediary product and then the carbonized product, which are removed at higher temperature. It may be obvious that, if the reactive gas is not present, or in vacuum, the curves for the relationships between the reaction rate and the temperature are shifted to the high temperature side because the reaction is simple pyrolysis. This explains why the conventional stabilization process of baking the device in vacuum takes such a long time.

According to the present invention, to the contrary, if the preceding activation process is terminated in a state where the semi-polymerized product, the intermediary product and the carbonized product are mixed and coexist, the semi-polymerized product and the intermediary product are removed while the carbonized product is preserved in the succeeding activation process so that there will occur no electric discharge nor other phenomena during the operation of the electron-emitting device due to the gas produced from the semi-polymerized product and the intermediary product and hence the service life and the performance of the device will not be adversely affected during the operation.

It should be noted here that a known method of manufacturing an electron-emitting device proposed by the inventors of the present invention may be accompanied by a problem that the stabilization process has a relatively low upper temperature limit depending on the thermal resistance of the materials of the electron-emitting device and hence also shows the above identified problems.

For the purpose of the invention, oxygen is preferably used as reactive gas because it reacts with the organic substance to produce carbon dioxide, carbon monoxide and water. The type of reactive gas and the partial pressures of the gas components may be appropriately selected depending on the materials involved in the reaction. If air or a mixture of oxygen and nitrogen is used as reactive gas and the stabilization process is carried out for manufacturing an image-forming apparatus comprising a large number of electron-emitting devices at the time when the envelope of the apparatus is hermetically sealed by heat, the heat used for the sealing operation can also be used for the above reaction to reduce the overall time required for the manufacture. The sealing temperature may be somewhere between 350 and 450° C. if frit glass is used for the sealing operation depending on the ability of withstanding high temperature of the carbon produced by the reaction. The reaction may advantageously be conducted in the atmosphere because there is no need of lowering the pressure if the atmosphere is used.

While graphite starts to be removed in the atmosphere at about 500° C., the intermediary product begins to be removed at about 200° C. At 400° C., the intermediary product that can give rise to electric discharges when the electron-emitting device is driven to operate will be removed almost completely to consequently stabilize the electron-emitting device for electron-emitting operation. Note that the above cited temperatures are for a film having a sufficiently large film thickness and a stabilization process carried out in the atmosphere. The temperatures will fall as the film thickness is reduced. Therefore, the heating temperature and the partial pressure of oxygen have to be selected depending on the conditions for the reaction. Since there is a trade-off between the heating temperature and the partial pressure of oxygen used for the stabilization process, the former will have to be raised if the latter is lowered or vice versa. In other words, the stabilization process can be adapted to different sealing temperatures for manufacturing an image-forming apparatus.

Figure 5:
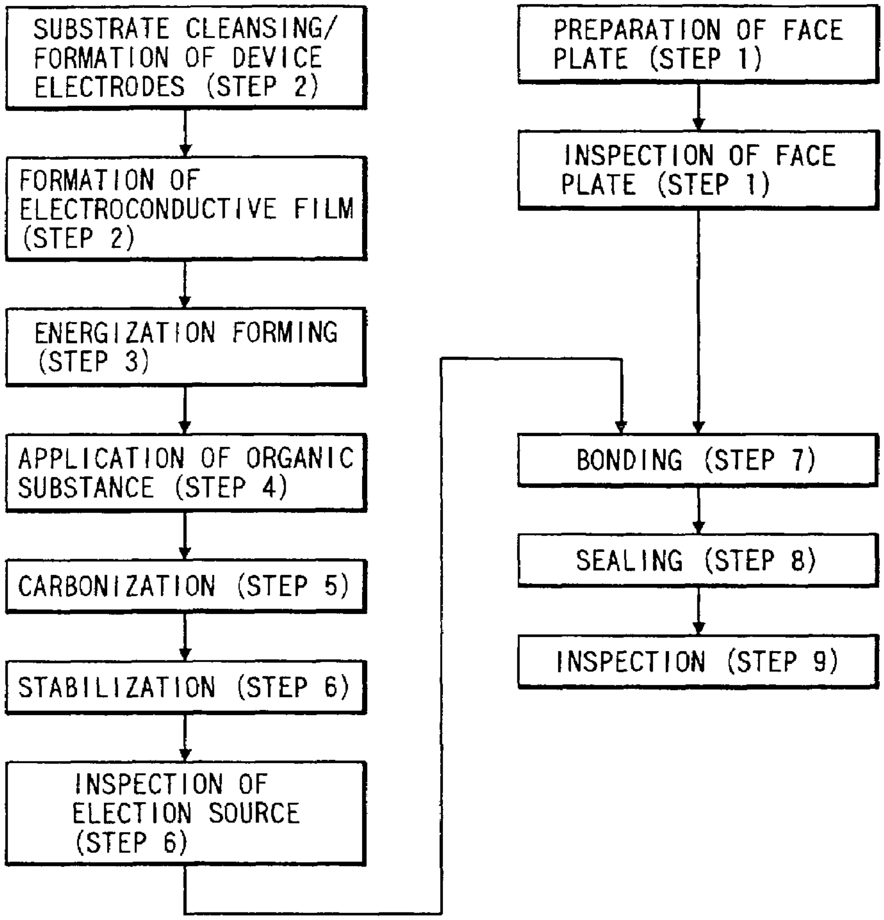
FIG. 5 is a flow chart of a method of manufacturing an image-forming apparatus according to the invention in a preferred mode of carrying out the method.

Now, a method of manufacturing an image-forming apparatus according to the invention will be described particularly in terms of assembling the apparatus. FIG. 5 shows a flow chart for manufacturing an image-forming apparatus in a preferred mode of carrying out the invention. The method of FIG. 5 can be divided into steps of preparing an electron source substrate, testing it, preparing a face plate, testing it and assembling the electron source substrate and the face plate carrying thereon an image-forming member into a vacuum envelope. Note that the stabilization process and the sealing process are provided separately in the flow chart. While the terms “display panel” and “image-forming apparatus” may seem interchangeable in the following description, the former refers to an image-forming apparatus before a drive circuit and some other components are fitted to it.

A method of manufacturing an image-forming apparatus according to the invention will be described in detail below.

(Step 1) (Preparation and Test of Face Plate)

As will be described in detail in the examples that follow, the face plate of an image-forming apparatus is prepared by forming a set of fluorescent bodies on a glass substrate by means of a printing or slurry technique and then the formed pattern of the fluorescent bodies is examined. Firstly a support frame of a display panel is bonded to the face plate along the periphery thereof by means of frit glass. If a large display panel is used, spacers are preferably bonded to the face plate in order to make the apparatus withstand the atmospheric pressure. A sheet frit is arranged along the area of the support frame to be bonded to the face plate.

(Baking of Face Plate) Then, the face plate is baked in vacuum at an appropriately selected temperature for an appropriately selected heating period in order to remove the water, oxygen, CO and $CO_2$ that have been adsorbed by the face plate.

(Step 2) (Rear Plate)

In this step, an electroconductive film is formed on each of a plurality of electron-emitting devices on the substrate and then wires are arranged for the devices. An organic substance may be applied to the substrate under this condition as described earlier. (See FIG. 2).

(Baking of Rear Plate) Then, the rear plate is baked in vacuum at an appropriately selected temperature for an appropriately selected heating period in order to remove the water, oxygen,/CO and $CO_2$ that have been adsorbed by the rear plate.

(Step 3) (Energization Forming Process) An energization forming process is conducted in a manner as described earlier.

(Step 4) (Process of Applying an Organic Substance)

An organic substance is applied in a manner as described earlier.

(Step 5) (Carbonization Process) The layered organic substance is carbonized by electrically energizing the substance. After the carbonization process, each electron-emitting device may be tested for the device current to check the electron source substrate by utilizing the relationship between the device current and the emission current of the devices. As described earlier, the devices may advantageously be heated for the carbonization process when they are electrically energized.

(Step 6) (Stabilization Process) An stabilization process is conducted in a manner as described earlier. After the stabilization process, the electron source substrate is tested for the device current and the emission current of each electron-emitting device.

The test is conducted in vacuum.

(Step 7) (Sealing Process) The rear plate and the face plate are bonded together by means of the frit glass arranged on the support frame in advance.

(Step 8) The exhaust pipe is sealed if it is provided. The getter arranged in the display panel is made to flash in order to maintain a predetermined level of vacuum inside the display panel.

(Step 9) The prepared display panel is electrically tested for the device current and the emission current of each device and also tested for the brightness of the fluorescent bodies of each pixel.

Then, a drive circuit and peripheral circuits are fitted to the display panel to complete the operation of manufacturing an image-forming apparatus.

Thus, according to a method of manufacturing an image-forming apparatus according to the invention, a complete electron source substrate is produced when a process of forming device electrodes and electroconductive films for electron-emitting devices, an activation process including steps of applying an organic substance and carbonizing the substance and a stabilization process are over so that each of the electron-emitting devices is tested for its performance and then the electron source comprising them is tested as a whole. Therefore, a good electron source and a good face plate can be combined to produce an image-forming apparatus and hence the probability of producing rejected apparatus can be greatly lowered to consequently reduce the cost of the manufactured apparatus. The process of producing a face plate will be described in greater detail hereinafter.

Now, an apparatus that can be used for a method of manufacturing an image-forming apparatus according to invention will be described.

An apparatus for manufacturing a display panel that can feasibly be used for the purpose of the invention comprises a number of load-lock type vacuum chambers that can effectively prevent the components of the display panel from adsorbing contaminants such as water, oxygen, hydrogen, CO and $CO_2$. Basically, it comprises a rear plate load chamber, a rear plate baking chamber, a forming chamber, a carbonization chamber, a stabilization chamber, a sealing chamber, a face plate load chamber, a face plate baking chamber and a slow cooling chamber. The chambers are separated from each other by partitions so that the vacuum condition of each chamber may be controlled independently. The substrate having been treated in each chamber is discharged from the chamber and is transferred to the succeeding chamber. A rear plate is received by the rear plate load chamber for processing and discharged from the stabilization chamber after completing the necessary processes. On the other hand, a face plate is received by the face plate load chamber, passes through the face plate baking chamber and then brought into the sealing chamber, where it is combined with a rear plate discharged from the stabilization chamber. The envelope produced by combining the face and rear plates is then moved to the slow cooling chamber, where it is cooled to room temperature. Each chamber is provided with an exhaust system comprising an oil free vacuum pump. The forming chamber, the carbonization chamber and the stabilization chamber are adapted not only to electrically processing operations but also to electric tests. The stabilization chamber and the sealing chamber are so arranged that gas can be fed into them for a stabilization process. The number of processing steps can be reduced if the forming step and the carbonization step are conducted in a same chamber and the stabilization step and the sealing step are conducted in another same chamber.

It should be noted apparatus other than the above described one may feasibly be used for a method of manufacturing an image-forming apparatus according to the invention so long as they can carry out the above processing steps.

EXAMPLE 1

FIGS. 1A and 1B schematically illustrate each of the surface conduction electron-emitting devices prepared in Example 1. FIG. 1A is a plan view and FIG. 1B is a sectional side view.

Referring to FIGS. 1A and 1B, the surface conduction electron-emitting device comprises a substrate 1, a pair of device electrodes 2 and 3, an electroconductive film 4 and an electron-emitting region 5.

FIGS. 6A through 6E are schematic sectional side views of each of the surface conduction electron-emitting devices prepared in Example 1, illustrating different manufacturing steps. The invention will be described hereinafter by referring to FIGS. 6A through 6E.

The sufrace conduction electron-emitting devices prepared in Comparative Example 1 for the purpose of comparison will also be described.

In the following description, the common substrate of the surface conduction electron-emitting devices of Example 1 will be referred to as substrate A, whereas that of their counterparts of Comparative Example 1 will be referred to as substrate B.

A total of four identical devices were formed on the substrate.

Each of the devices on the substrate A were prepared in the following manner.

(Step 1): (step of cleansing a substrate/forming device electrodes) After thoroughly cleansing the substrate 1, Pt was deposited thereon to a thickness of 30 nm by sputtering for the device electrodes, using a mask.

Figure 6A:
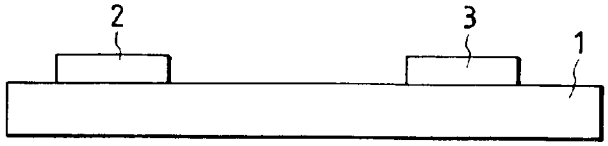
FIGS. 6A, 6B, 6C, 6D and 6E are schematic sectional side views of the surface conduction electron-emitting device prepared in Example 1, illustrating different manufacturing steps.

Thereafter, a mask of Cr film was formed by vacuum evaporation to a thickness of 100 nm for patterning the electroconductive film 4 to be produced there, using a lift-off technique (FIG. 6A).

The device electrodes was separated by a distance L of 10 μm and had a width W of 100 μm.

(Step 2): (step of forming an electroconductive film) An organic palladium solution (ccp4230: available from Okuno Pharmaceutical Co., Ltd.) was applied to a surface area of the substrate 1 bridging the device electrodes 2 and 3 by means of a spinner and left there until an organic metal thin film was formed.

Thereafter, the organic thin film was baked at 300° C. for 10 minutes in the atmosphere to obtain an electroconductive film 4, which was a film of fine particles containing PdO as principal ingredient having a film thickness of 10 nm and an electric resistance of $5\times10^4$ Ω/□.

Figure 6B:
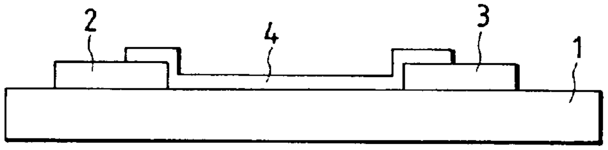

Subsequently, the Cr film and the baked electroconductive film 4 were etched to show a desired pattern by wet etching, using an acidic etchant (FIG. 6B).

(Step 3): (step of applying an organic substance)

Figure 6C:
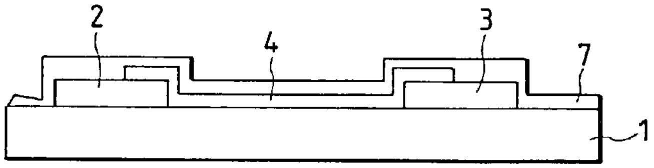

Then, an organic substance that features the method of the invention was applied (FIG. 6C). In this example, polyacrylnitrile which is thermosetting resin was dissolved into a solvent of dimethylamide and the solution was applied to the entire surface of the substrate by spinner to a thickness of 20 nm and the applied solution was pre-baked at 100° C. Note that an organic substance may well be applied only to the electroconductive film for the purpose of the invention. A lift-off technique was used in this step.

Figure 6D:
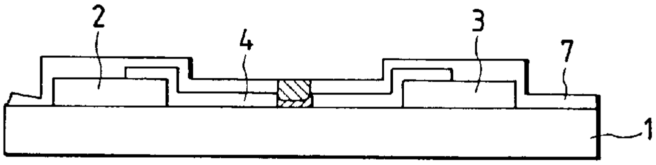
Figure 7:
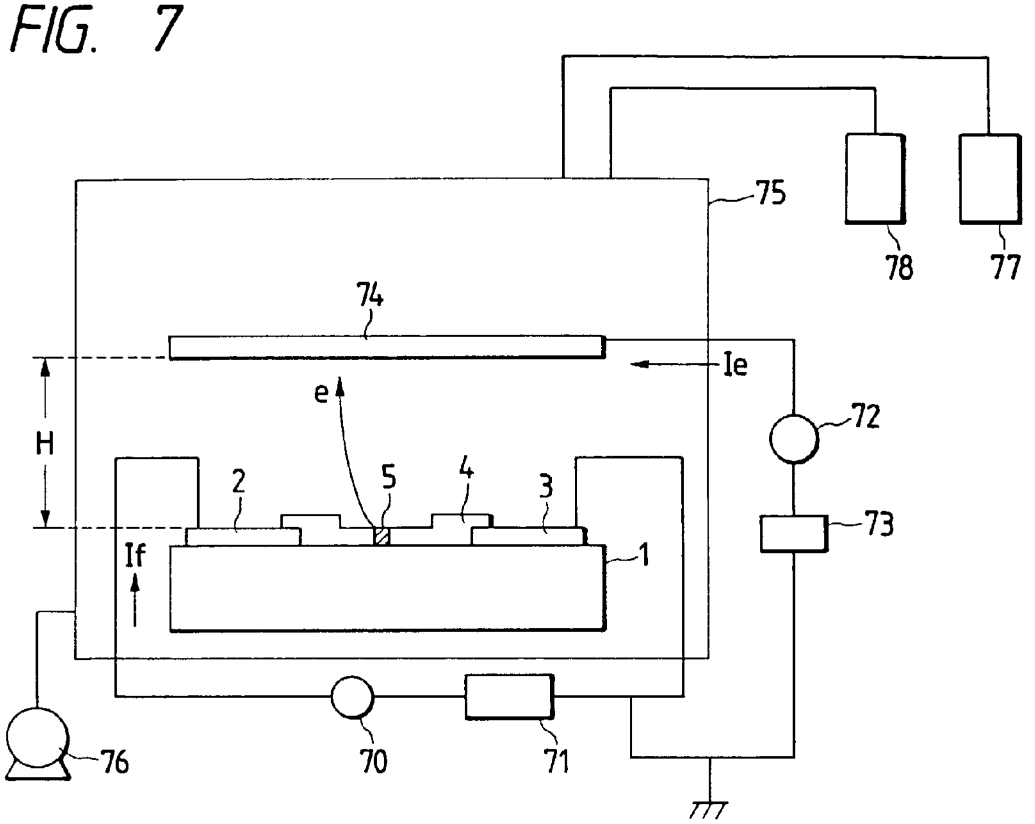
FIG. 7 is a vacuum treatment apparatus that can be used as a gauging system for evaluating the performance of a surface conduction electron-emitting device.

(Step 4): (energization forming step) Subsequently, the substrate A was placed in a vacuum processing apparatus as illustrated in FIG. 7, which was then evacuated. Then, a pulse-shaped voltage was applied to the device electrodes 2 and 3 for an electrically energizing operation, which is referred to as energization forming (FIG. 6D). Separately, the voltage was further applied to saturate the divice current. This saturation is considered to be a result of completion of activation of the organic substance applied there.

A rectangular pulse wave with a pulse width T1 of 1 millisecond and a pulse interval T2 of 10 milliseconds was used for the pulse voltage of energization forming and the wave height of the pulse was increased gradually. This step was conducted in vacuum with a degree of $10^{-5}$ Pa.

FIG. 7 schematically illustrates the vacuum processing apparatus used for this step. The apparatus also operates as a gauging system.

Referring to FIG. 7, the vacuum processing apparatus comprises a vacuum vessel 75 and an exhaust pump 76. An electron-emitting device is arranged in the vacuum vessel 75. The device comprises a substrate 1, a pair of device electrodes 2 and 3, an electroconductive film 4 and an electron-emitting region. Otherwise, the processing apparatus is provided with a power source 71 for applying a device voltage Vf to the electron-emitting device, an ammeter 70 for reading the device current If flowing through the electroconductive film 4 between the device electrodes 2 and 3 and an anode 74 for catching the emission current Ie emitted from the electron-emitting region 5 of the device. Reference numeral 73 denotes a high voltage power source for applying a high voltage to the anode 74 and reference numeral 72 denotes another ammeter for reading the emission current Ie emitted from the electron-emitting region 5 of the electron-emitting device.

The vacuum vessel 75 additionally contains therein a vacuum gauge and other instruments necessary for carrying out the energization forming operation in vacuum so that the make and the performance of the electron-emitting device may be gauged and evaluated in vacuum. The exhaust pump 76 is provided with an ordinary high vacuum system comprising a turbo pump and a rotary pump and an ultrahigh vacuum system comprising an ion pump. Additionally, an oxygen cylinder 77 or a gas cylinder containing a mixture gas of oxygen, nitrogen and other gaseous components is arranged for a stabilization process that follows. Reference numeral 78 denotes an ampule containing acetone to be used as activating substance.

The entire vacuum processing apparatus containing an electron source substrate illustrated in FIG. 7 can be heated up to 450° C. by means of a heater (not shown). Thus, this vacuum processing apparatus can be used for the energization forming step and subsequent steps.

(Step 5): (carbonization step) Then, a drive voltage of 15V having a rectangular pulse shape with T1=1 ms and T2=10 ms as shown in FIG. 3A was applied to the electron-emitting device for 15 minutes in vacuum with a degree of $10^{-5}$ Pa. The device current If was observed throughout this step and it was found that the device current If increased with time to get to 1.2 mA at the end of the 15 minutes (FIG. 6D).

(Step 6): (stabilization step) Then, air was introduced into the vacuum vessel of FIG. 7 and the device was thermally treated at 410° C. under the atmospheric pressure for 10 minutes in the apparatus. No deformation of fine particles was observed in the electroconductive film 4 obviously because the device was heated in air.

Figure 6E:
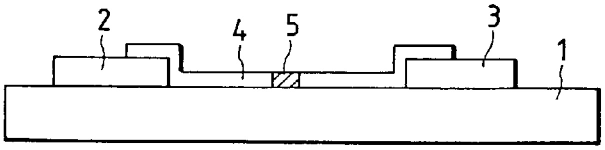

Subsequently, the vacuum vessel was evacuated to a degree of vacuum of $10^{-6}$ Pa and then hydrogen was introduced into the vessel at room temperature to reduce the electroconductive film chemically and consequently the electric resistance of the electroconductive film. Note that the electroconductive film was chemically reduced in each of the following examples unless specifically noted otherwise. Thereafter, each of the electron-emitting devices formed on the substrate A was tested for the device current If and the emission current Ie (FIG. 6E).

Comparative Example 1

Each of the electron-emitting devices on the substrate B was prepared in the following way in Comparative Example 1.

(Step 1): (step of cleansing a substrate/forming device electrodes) Same as Step 1 for the substrate A.

(Step 2): (step of forming an electroconductive film) Same as Step 2 for the substrate A.

(Step 3): (energization forming step) Same as Step 4 for the substrate A. (No step equivalent to Step 3 for the substrate A in this example.)

(Step 4): (activation process) After introducing acetone into the vacuum vessel of the apparatus of FIG. 7 to produce a pressure of $10^{-2}$ Pa, a drive voltage of 15V having a rectangular pulse shape with T1=1 ms and T2=10 ms as shown in FIG. 3A was applied to the electron-emitting device for 30 minutes. The device current If was observed throughout this step and it was found that the device current If increased with time to get to 2 mA at the end of the 20 minutes.

(Step 5): (stabilization process in vacuum) Subsequently, the vacuum vessel of the vacuum processing apparatus of FIG. 7 was evacuated to a degree of vacuum $10^{-6}$ Pa and then heated the substrate B by a heater (not shown) at 200° C. for 15 hours. Thereafter, the substrate was cooled to room temperature and each of the electron-emitting devices formed on the substrate B was tested for the device current If and the emission current Ie.

Both the substrate A and the substrate B were tested under same condition. Specifically, the voltage of the anode was 1 kV, which was separated from the electron-emitting device being tested by 5 mm, and a device voltage of 15V was applied to the electron-emitting device.

The device current If was 1.3 mA±15% and the emission current Ie was 1.0 μA±15% for the substrate B. On the other hand, the device current If was 0.7 mA±5% and the emission current Ie was 0.95 μA±4.5% for the substrate A to prove a substantially equal emission current Ie and a slightly reduced device current If with a reduced deviation in the performance of the devices of the substrate A when compared with the substrate B.

After the above observation, the prepared electron-emitting devices were driven continuously in the gauging system under the above described conditions to find that, while the emission current Ie of the devices of the substrate B fell by 56% from the above observed value, that of the devices of the substrate A fell only by 25%. Thereafter, the electron-emitting regions 5 of the devices of the substrates A and B were observed through an electron microscope and by means of Raman spectroscopy.

Figure 8:
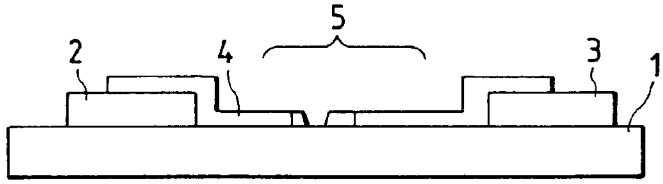
FIG. 8 is a schematic sectional side view of the surface conduction electron-emitting device prepared in Example 1, illustrating its structure.
Figure 18:
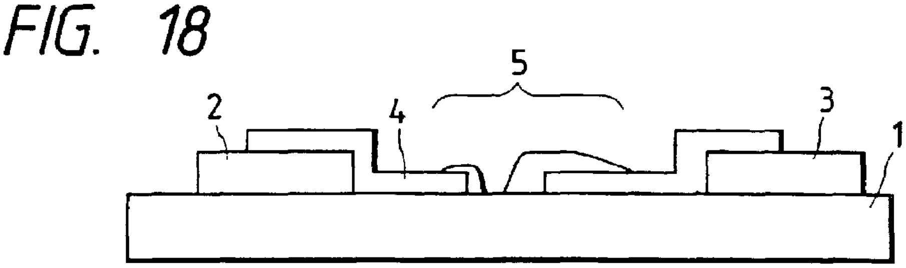
FIG. 18 is a schematic sectional side view of the surface conduction electron-emitting device prepared for comparison in Example 1, illustrating its structure.

FIG. 8 schematically illustrates one of the electron-emitting devices of the substrate A as observed through a microscope, whereas FIG. 18 shows its counterpart of substrate B. In the electron-emitting device of substrate B, a newly formed film deposit of carbon was found mainly on the high potential side of the electroconductive film and partly away from the electron-emitting region, depending on the direction of voltage application in Step 4. On the other hand, in the electron-emitting device of substrate A, a newly formed film deposit of carbon was found mainly at the tip of the high potential side of the electroconductive film, depending on the direction of voltage application in Step 5. When viewed with a higher magnification, the film deposit was also observed around and among metal fine particles on both substrate A and substrate B. Carbon was found less on the electroconductive films of the substrate A with a smaller deviation among the devices than on the films of the substrate B.

When observed through a transmission electron microscope and by means of Raman spectroscopy, it was found that the devices of the substrate A had a carbon deposit of graphite, whereas the carbon deposit of the devices of the substrate B was less crystalline and contained hydrogen to a small extent.

When the stabilization process of Step 5 of Comparative Example 1 was conducted as in Step 6 of this example, not conducted in the atmosphere, the prepared devices showed a device current and an emission current comparable to but slightly lower than to those of the devices of Example 1 to prove that the stabilization process of Example 1 can feasibly be applied to a known method. The devices showed a profile as shown in FIG. 8.

EXAMPLE 2

The steps taken in this examples are same as those of Example 1 except Steps 4 through 6.

(Step 1): (step of cleansing a substrate/forming device electrodes) Same as Step 1 for the substrate A in Example 1.

(Step 2): (step of forming an electroconductive film) Same as Step 2 for the substrate A in Example 1.

(Step 3): (energization forming step) Same as Step 4 for the substrate A in Example 1.

(Step 4): (step of applying an organic substance) After drawing the substrate out of the gauging system, a semi-polymerized product of furfuryl alcohol that had been prepared in advance was applied to it to a thickness of 25 nm by means of a spinner and then baked at 100° C. until it was set by heat. The semi-polymerized product was prepared by adding toluene sulfonate to furfuryl alcohol that contained water by less than 1% and heating and stirring the mixture in a thermostatic bath at 70 to 90° C.

(Step 5): (carbonization process) Then, the substrate was returned into the vacuum vessel of the gauging system, which was evacuated to $10^{-5}$ Pa. Thereafter, a drive voltage of 15V having a triangular pulse shape with T1=2 ms and T2=10 ms as shown in FIG. 3B was applied to the electron-emitting device for 20 minutes, reversing the high potential side and the low potential side of the device electrodes by every pulse. The device current If was observed throughout this step and it was found that the device current If increased with time to get to 1.2 mA at the end of the 20 minutes.

(Step 6): (stabilization step) Then, the substrate was divided into two halves, which will be referred to substrates A-1 and A-2.

For the substrate A-1, air was introduced into the vacuum vessel of FIG. 7 and each device was thermally treated at 380° C. under the atmospheric pressure for 20 minutes in the apparatus. Then, the vacuum vessel was evacuated to $10^{-6}$ Pa and each of the electron-emitting devices on the substrate was tested for the device current If and the emission current Ie.

For the substrate A-2, the vacuum vessel of FIG. 7 was evacuated to $10^{-6}$ Pa and the substrate A-2 was heated at 200° C. for 15 hours by means of a heater (not shown). Thereafter, the substrate A-2 was cooled to room temperature and each of the electron-emitting devices on the substrate was tested for the device current If and the emission current Ie.

Both the substrate A-1 and the substrate A-2 were tested under same conditions. Specifically, the voltage of the anode was 1 kV, which was separated from the electron-emitting device being tested by 5 mm, and a device voltage of 15V was applied to the electron-emitting device. The device current If was 1.2 mA±8% and the emission current Ie was 1.0 μA±8.5% for the substrate A-2. On the other hand, the device current If was 0.8 mA±4.5% and the emission current Ie was 0.95 μA±4.5% for the substrate A to prove a substantially equal emission current Ie and a slightly reduced device current If with a reduced deviation in the performance of the devices of the substrate A-1 when compared with the substrate A-2.

Then, the dependence of the emission current Ie and the device current If on the device voltage Vf were studied for both the substrates A-1 and A-2, by using a varying device voltage Vf under the above described test conditions.

Figure 9:
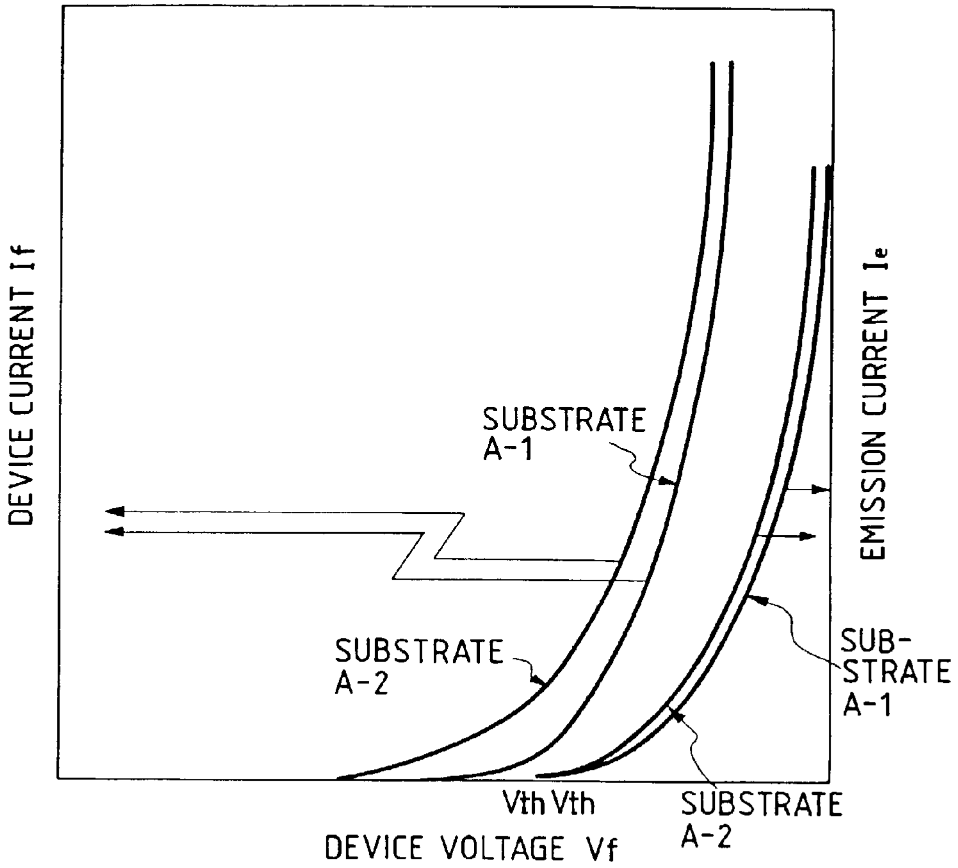
FIG. 9 is a graph illustrating the relationship between the device voltage Vf and the device current If along with the relationship between the device voltage Vf and the emission current Ie of the electron-emitting device prepared in Example 2.

FIG. 9 illustrates the dependence of the emission current Ie and the device current If on the device voltage Vf. As seen from FIG. 9, both the device current If and the emission current Ie monotonically rose as the device voltage Vf was increased. The emission current Ie had a threshold voltage (Vth) and increased only below the threshold voltage. Since the devices of the substrate A-2 were larger than their counterparts of the substrate A-1, a leak current seemed to have been produced in their device current If. Presumably, the electron-emitting region was partly short-circuited to produce the leak current.

After the above observations, the devices were driven to operate continuously under the above described test conditions to find that the device current decreased by 15% for both of the substrates A-1 and A-2.

Subsequently, the electron-emitting regions 5 of the devices of the substrates A-1 and A-2 were observed through an electron microscope and by means of Raman spectroscopy.

Figure 10:
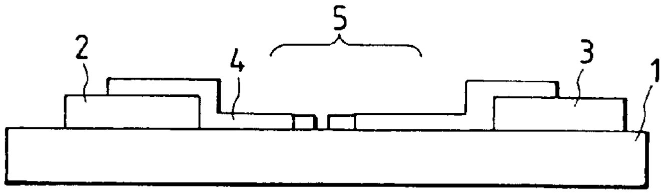
FIG. 10 is a schematic sectional side view of the surface conduction electron-emitting device prepared in Example 2, illustrating its structure.
Figure 19:
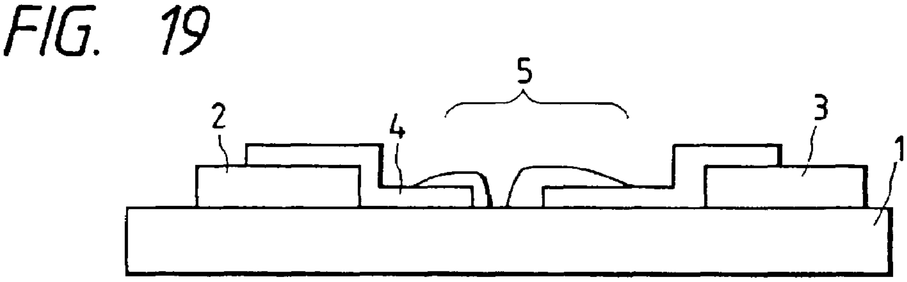
FIG. 19 is a schematic sectional side view of the surface conduction electron-emitting device prepared for comparison in Example 2, illustrating its structure.
Figure 20:
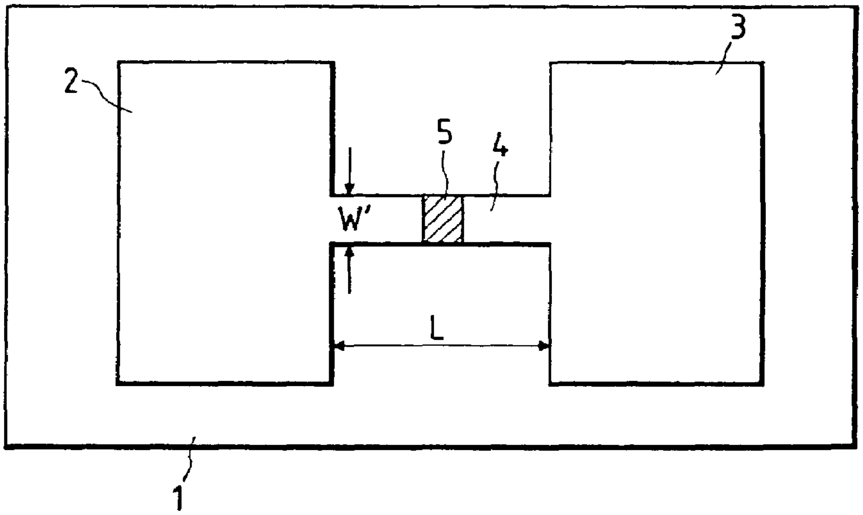
FIG. 20 schematically illustrates a conventional surface conduction electron-emitting device.

FIG. 10 and FIG. 19 respectively illustrate the devices on the substrates A-1 and A-2 observed through an electron microscope. As shown in FIG. 10, carbon was found at the opposite front walls of the fissure of the electroconductive film in the electron-emitting region 5, or both the low potential side and the high potential side, of each of the devices of the substrate A-1. On the other hand, a film deposit of carbon was found in the electron-emitting region 5 and on the electroconductive film on both the low potential side and the high potential side of each of the devices of the substrate A-2 as shown in FIG. 19.

When observed through a transmission electron microscope and by means of Raman spectroscopy, it was found that the devices of both the substrate A-1 and the substrate A-2 had a film deposit of glassy carbon. In the case of the substrate A-2, part of the carbon deposit of the devices contained a compound of carbon and hydrogen to a slight extent. The term "glassy carbon" generally refers to carbon having a randomly arranged multilayer structure and a non-oriented fine texture with small crystalline dimensions, a high rigidity and a high density. Additionally, it is generally very hard. In the above observation of Raman spectroscopy, an oscillation line of 514.5 nm of argon laser was used to find a Raman line at 1590/cm and 1355/cm, whose half-width was remarkably greater than the Raman line at 1581/cm of HOPG (highly oriented pyrolytic graphite).

EXAMPLE 3

Negative type electron beam resist was used in this example. Two substrates A and B were used as in Example 1. Since Steps 1 through 5 were substantially same as those of Example 1, they will be described by referring to FIGS. 6A, 6B, 6C, 6D and 6E.

(Step 1): (step of cleansing a substrate/forming device electrodes) After thoroughly cleansing the both substrates A and B, Pt was deposited thereon to a thickness of 30 nm by sputtering for the device electrodes, using a mask. Thereafter, a mask of Cr film was formed by vacuum evaporation to a thickness of 100 nm for patterning the electroconductive film 4 to be produced there, using a lift-off technique (FIG. 6A).

The device electrodes was separated by a distance L of 10 μm and had a width W of 100 μm.

(Step 2): (step of forming an electroconductive film) Pt was deposited by sputtering on the substrate carrying thereon the device electrodes 2 and 3 to form an electroconductive film 4 having a film thickness of 3 nm and an electric resistance of $3\times10^4$ Ω/□.

Subsequently, the Cr film and the baked electroconductive film 4 were etched to show a desired pattern by wet etching, using an acidic etchant (FIG. 6B).

(Step 3): (step of applying an organic substance) Then, an organic substance that features the method of the invention was applied. In this example, epoxidated 1,4-polybutadiene which is negative type electron beam resist was applied onto the substrate to a thickness of 40 nm by means of a spinner to cover at least the electroconductive film 4 and pre-baked at 100° C. (FIG. 6C).

(Step 4): (energization forming step) Subsequently, the substrate A was placed in a vacuum processing apparatus as illustrated in FIG. 7, which was then evacuated. Then, a pulse voltage was applied to the device electrodes 2 and 3 for energization forming by means of a power source (not shown) (FIG. 6D).

A rectangular pulse wave with a pulse width T1 of 1 millisecond and a pulse interval T2 of 10 milliseconds was used for the pulse voltage of energization forming and the wave height of the pulse was increased gradually. This step was conducted in vacuum with a degree of $10^{-5}$ Pa.

(Step 5): (carbonization step) Then, a drive voltage of 15V having a rectangular pulse shape with T1=1 ms and T2=10 ms as shown in FIG. 3A was applied to the electron-emitting device for 12 minutes in vacuum with a degree of $10^{-5}$ Pa. The device current If was observed throughout this step and it was found that the device current If increased with time to get to 1.5 mA at the end of 12 minutes for both the substrates A and B. Then, the device was driven for 10 more minutes to find that the device current If remained substantially at the same level.

(Step 6): (stabilization step) Then, air was introduced into the vacuum vessel of FIG. 7 and each of the devices of the substrate A was thermally treated at 400° C. under the atmospheric pressure for 20 minutes in the apparatus. Subsequently, the vacuum vessel was evacuated to a degree of vacuum of $10^{-6}$ Pa and each of the electron-emitting devices formed on the substrate A was tested for the device current If and the emission current Ie (FIG. 6E).

On the other hand, the devices of the substrate B were heat treated at 200° C. in vacuum with a degree of $10^{-5}$ Pa for 15 hours in the vacuum processing apparatus of FIG. 7. Then, the vacuum vessel was further evacuated to $10^{-6}$ Pa and each of the electron-emitting devices on the substrate B was tested for the device current If and the emission current Ie.

Both the substrate A and the substrate B were tested under same conditions. Specifically, the voltage of the anode was 1 kV, which was separated from the electron-emitting device being tested by 5 mm, and a device voltage of 15V was applied to the electron-emitting device.

The device current If was 0.8 mA±4.5% and the emission current Ie was 1.0 μA±4.5% for the substrate A, while the device current If was 1.0 mA±4.5% and the emission current Ie was 1.0 μA±4.9% for the substrate B to prove that they were substantially equal with the corresponding respective values of the substrate A.

After the above observation, the prepared electron-emitting devices were driven continuously in the gauging system under the above described conditions except that the anode voltage was 10 kV to find that the emission current Ie of the devices fell by 23% from the above observed values for both the substrates A and B. No electric discharge was observed during the above operation of continuously driving the devices. Note that the substrate B of Example 1 could give rise to electric discharges. The reason why no electric discharge occurred on both the substrates A and B of this example alike may be that the negative type electron beam resist was substantially completely carbonized in the carbonization process and no gas was generated during the operation or that the intermediary product, if existed in the devices of the substrate B, was not decomposed but polymerized and carbonized while the device was driven to operate. On the other hand, the reason why the devices of Comparative Example 1 that had been similarly processed for stabilization in vacuum could give rise to electric discharges may be that the intermediary product formed in the activation process had not been removed sufficiently.

Thereafter, the electron-emitting regions 5 of the devices of the substrates A and B were observed through an electron microscope and by means of Raman spectroscopy.

When viewed through an electron microscope, the electron-emitting regions 5 of the devices of the substrate A showed a profile substantially similar to the one shown in FIG. 8 for Example 1. On the other hand, that of the substrate A showed a profile substantially similar to the one shown in FIG. 18.

When observed through a transmission electron microscope and by means of Raman spectroscopy, it was found that the devices of the substrate A and B had a carbon deposit principally made of graphite of the same crystallity as the graphite for Example 1.

EXAMPLE 4

The steps taken in this examples are same as those of Example 3. However, only a single substrate was prepared in this example.

(Step 1): (step of cleansing a substrate/forming device electrodes) Same as Step 1 in Example 3.

(Step 2): (step of forming an electroconductive film) Same as step 2 in Example 3.

(Step 3): (step of applying an organic substance) Glycidyl methacrylate-ethyl acrylate copolymer which is negative type electron beam resist was applied onto the substrate to a thickness of 35 nm by means of a spinner and pre-baked at 90° C.

(Step 4): (energization forming step) Same as Step 2 of Example 3.

(Step 5): (carbonization process) Then, the substrate was returned into the vacuum vessel of the gauging system, which was evacuated to $10^{-5}$ Pa. Thereafter, a drive voltage of 15V having a rectangular pulse shape with T1=1.5 ms and T 2=10 ms as shown in FIG. 3A was applied to the electron-emitting device for 15 minutes, reversing the high potential side and the low potential side of the device electrodes by every pulse. The device current If was observed throughout this step and it was found that the average device current If of the four devices increased with time to get to 1.5 mA at the end of the 15 minutes.

(Step 6): (stabilization step) Same as Step 6 of Example 3.

Then, the devices on the substrate were tested under the conditions same as those the preceding examples. Specifically, the voltage of the anode was 1 kV, which was separated from the electron-emitting device being tested by 5 mm, and a device voltage of 15V was applied to the electron-emitting device.

The device current If was 0.8 mA±4.5% and the emission current Ie was 1.0 μA±4.5% to show that the emission current Ie was substantially equal to that of the Comparative Example 1 and the device current If was slightly lower than that of the Comparative Example 1. The devices show a reduced degree of deviation.

After the above observation, the prepared electron-emitting devices were driven continuously in the gauging system under the above described conditions to find that the emission current Ie of the four devices fell by less than 25% from the above observed value. This is substantially equal to the comparable value of the substrate A of Example 1.

Subsequently, the electron-emitting regions 5 of the devices of the substrate was observed through an electron microscope and by means of Raman spectroscopy. FIG. 10 schematically illustrates the devices on the substrate observed through an electron microscope. As shown in FIG. 10, carbon was found at the opposite front walls of the fissure of the electroconductive film in the electron-emitting region 5, or both the low potential side and the high potential side, of each of the devices of the substrate.

When observed through a transmission electron microscope and by means of Raman spectroscopy, it was found that the devices of both the substrate had a film deposit principally made of crystalline graphite as in the case of Example 1.

EXAMPLE 5

In this example, the substrate was made of the material of the substrate A of Example 1 and the steps of Example 1 were followed except Steps 5 and 6, which will be described below.

(Step 5): (carbonization process) Then, the substrate was returned into the vacuum vessel of the gauging system, which was evacuated to $10^{-5}$ Pa. Thereafter, a laser pulse beam was externally irradiated onto the electron-emitting region and its vicinity to locally heat the electron-emitting region, while a drive voltage of 15V having a triangular pulse shape with T1=0.3 ms and T2=10 ms as shown in FIG. 3B was applied to the electron-emitting device for 10 minutes, reversing the high potential side and the low potential side of the device electrodes by every pulse. A device current If of 1.2 mA was observed at the end of the 10 minutes. A small value was selected for T1 because the electron-emitting region was heated by a laser beam but the device current If increased without giving rise to any problem, suggesting that the overall energy was effectively utilized for driving the devices. The temperature the electroconductive film was raised by 200° C. by the laser beam.

(Step 6): (stabilization step) Then, a mixture gas containing $N_2$ by 80% and $O_2$ by 20% was introduced into the vacuum processing apparatus of FIG. 7 to produce a pressure of $10^{-1}$ Pa and the devices were thermally treated at 440° C. for 20 minutes. While a high heat treatment temperature was used because the heat treatment was conducted under low pressure, no problem was observed on the devices in terms of their electric characteristics. Then the devices on the substrate tested for the device current If and the emission current Ie under the conditions same as those the preceding examples. Specifically, the voltage of the anode was 1 kV, which was separated from the electron-emitting device being tested by 5 mm, and a device voltage of 15V was applied to the electron-emitting device.

The device current If was 0.9 mA±5.5% and the emission current Ie was 0.9 μA±5.2% to show that the emission current Ie was substantially equal to that of the Example 1 and the device current If was slightly lower than that of the Example 1. The devices show a reduced degree of deviation.

After the above observation, the prepared electron-emitting devices were driven continuously in the gauging system under the above described conditions to find that the emission current Ie of the four devices fell by less than 25% from the above observed value. This is substantially equal to the comparable value of the substrate A of Example 1.

Subsequently, the electron-emitting regions 5 of the devices of the substrate was observed through an electron microscope and by means of Raman spectroscopy. FIG. 10 schematically illustrates the devices on the substrate observed through an electron microscope. As shown in FIG. 10, carbon was found at the opposite front walls of the fissure of the electroconductive film in the electron-emitting region 5, or both the low potential side and the high potential side, of each of the devices of the substrate. When observed through a transmission electron microscope and by means of Raman spectroscopy, it was found that the devices of both the substrate had a film deposit principally made of crystalline graphite as in the case of Example 1.

EXAMPLE 6

The steps taken in this examples are same as those of Examples 1 and 2 except the step of forming an electroconductive film.

(Step 1): (step of cleansing a substrate/forming device electrodes) Same as Step 1 for the substrate A in Example 1.

(Step 2): (step of forming an electroconductive film) Pt and Ni were deposited to produce a film of catalytic metals having an appropriate film thickness between the device electrodes 2 and 3 formed on the substrate 1. Similarly, W was deposited to produce a film of a non-catalytic metal for a comparative example. Otherwise, this step was same as Step 2 for the substrate A in Example 1.

(Step 3): (step of applying an organic substance) Same as Step 3 for the substrate A in Example 1.

(Step 4): (energization forming step) Same as Step 4 for the substrate A in Example 1.

(Step 5): (carbonization process) Same as Step 5 of Example 2.

(Step 6): (stabilization step) Same as Step 6 of Example 2.

Then, the devices on the substrate tested under the conditions same as those of Example 2 and the electron-emitting region was observed. The table below summarizes the results of the test and the observation of the electron-emitting region.

As seen from the table, glassy carbon was deposited on the front walls of the fissure of electroconductive film in the electron-emitting region 5 of the devices using a non-catalytic metal of W for the electroconductive film, that is to say on both the low potential side and the high potential side but only partly along the direction of electron-emitting length. This may explain why both the device current If and the emission current Ie of the above devices were lower than those of the devices using catalytic metals of Pt and Ni. Note that the direction of electron-emitting length refers to the direction of W' in FIG. 1A.

TABLE

Electron-Emitting Region with Different Materials for the Electroconductive Film

| material of conductive film | electron-emitting characteristics | observations on electron-emitting region |
|---|---|---|
| Pt | device current If = 0.75 mA emission current Ie = 1.0 μA | glassy carbon on front walls of fissure in electron-emitting region 5 on both high and low potential sides |
| Ni | device current If = 0.8 mA emission current Ie = 1.1 μA | glassy carbon on front walls of fissure in electron-emitting region 5 on both high and low potential sides |

TABLE-continued

| Electron-Emitting Region with Different Materials for the Electroconductive Film | | |
|---|---|---|
| material of conductive film | electron-emitting characteristics | observations on electron-emitting region |
| W | device current If = 0.6 mA emission current Ie = 0.5 μA | glassy carbon on part of front walls of fissure in electron-emitting region 5 on both high and low potential sides |

EXAMPLE 7

In this example, an image forming apparatus was prepared by using an electron source comprising a plurality of surface conduction electron-emitting devices of FIGS. 1A and 1B on a substrate and wiring devices of FIGS. 1A and 1B on a substrate and wiring them to form a simple matrix arrangement. Such an image-forming apparatus is also referred to as color flat display.

Figure 11:
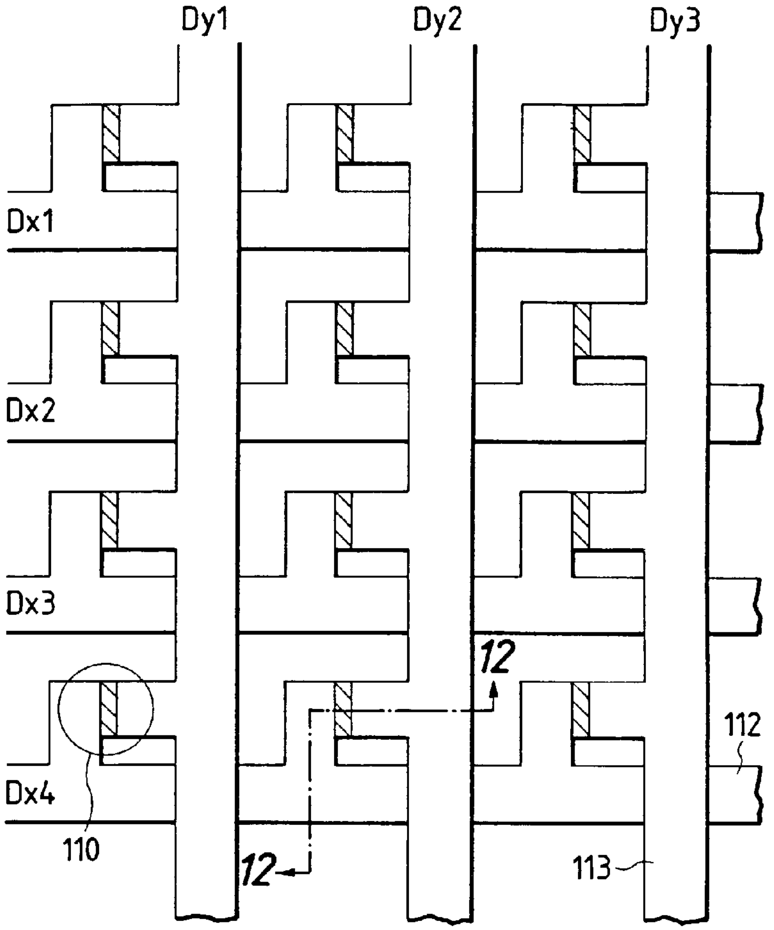
FIG. 11 is a schematic partial plan view of an electron source with a simple matrix arrangement, which is applicable to an image-forming apparatus prepared and described in Example 7.
Figure 12:
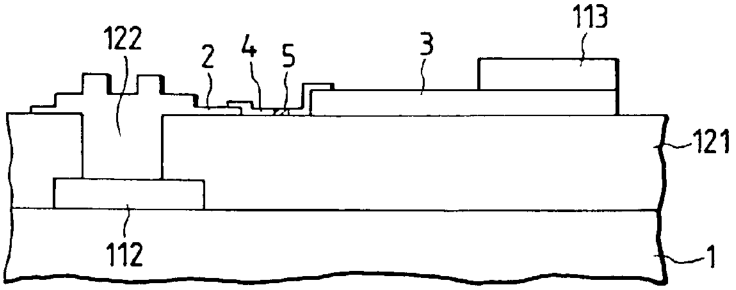
FIG. 12 is a schematic cross sectional view of the electron source of FIG. 11 taken along line 12-12.
Figure 13A:
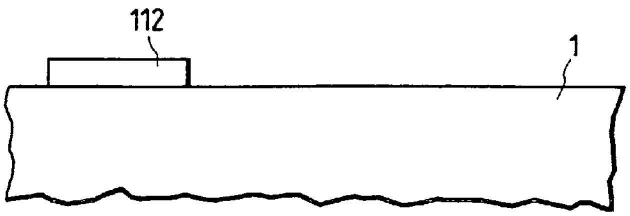
FIGS. 13A, 13B, 13C, 13D, 13E, 13F, 13G, 13H, 13I, 13J, 13K and 13L are schematic partial sectional views of the image-forming apparatus of Example 7, illustrating different manufacturing steps.
Figure 13B:
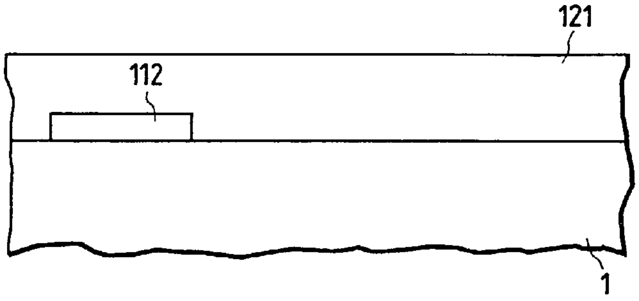
Figure 13C:
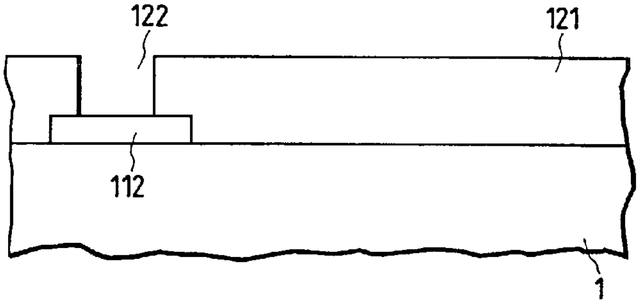
Figure 13D:
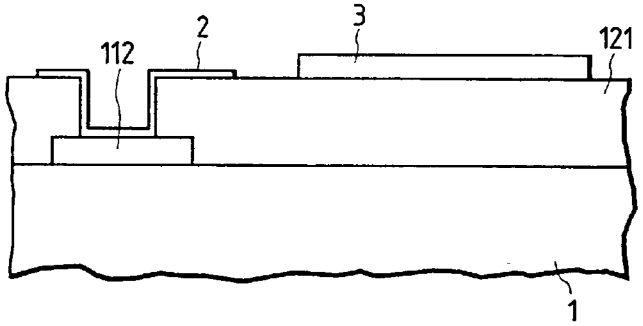
Figure 13E:
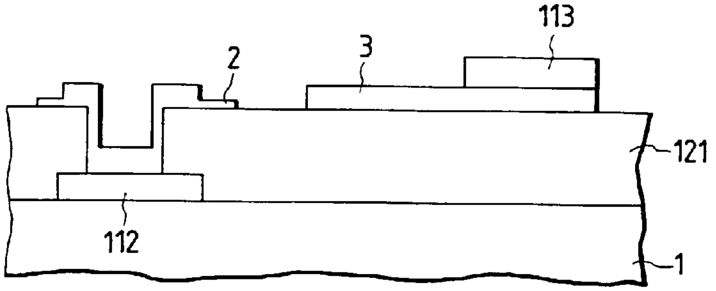
Figure 13F:
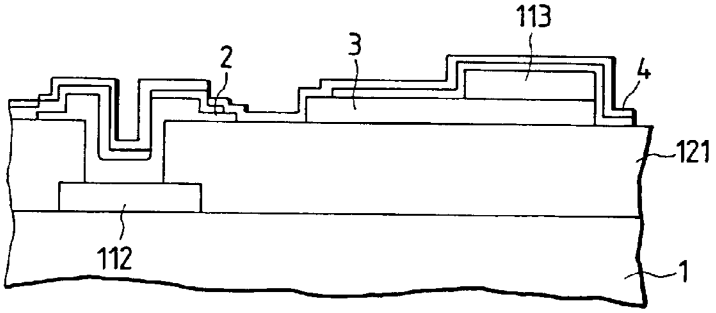
Figure 13G:
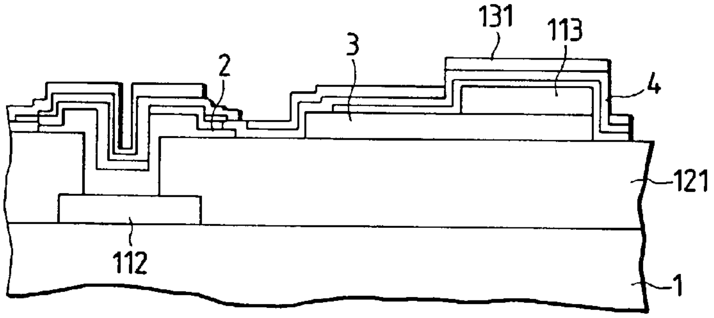
Figure 13H:
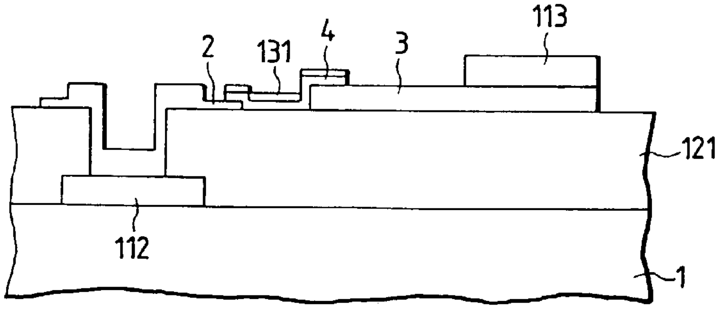
Figure 13I:
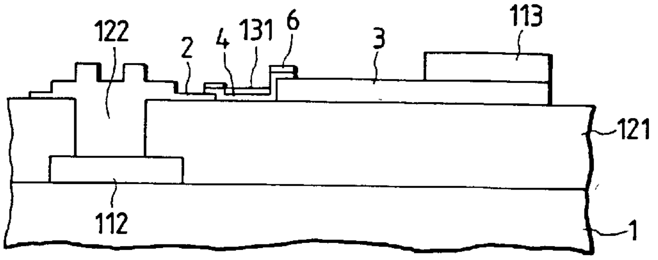
Figure 13J:
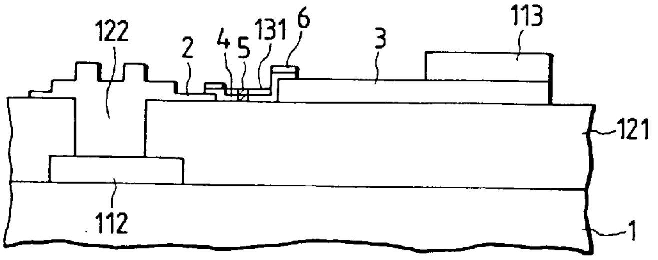
Figure 13K:
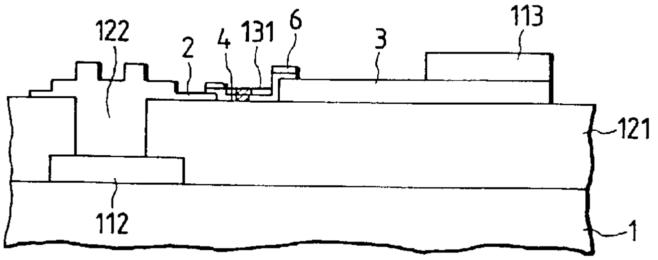
Figure 13L:
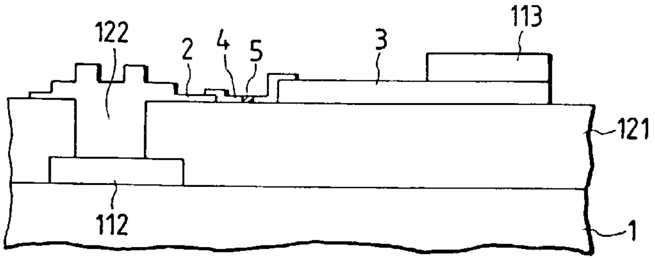

FIG. 11 shows a schematic partial plan view of an electron source applicable to an image-forming apparatus. FIG. 12 is a schematic sectional view taken along line 12-12 of FIG. 11. FIGS. 13A through 13L show schematic partial sectional views of the electron source of FIG. 11. Throughout FIGS. 11, 12 and 13A through 13L, same reference symbols denote same or similar components.

The electron source had a substrate 1, X-directional wires 112 (also referred to as lower wires) corresponding to Dxn and Y-directional wires 113 (also referred to as upper wires) corresponding to Dyn. Each of the devices of the electron source comprised a pair of device electrodes 2 and 3 and an electroconductive thin film 4 including an electron-emitting region. Otherwise, the electron source was provided with an interlayer insulation layer 121 and contact holes 122, each of which electrically connected a corresponding device electrode 2 and a corresponding lower wire 112.

The steps of manufacturing the electron source will be described by referring to FIGS. 13A through 13L, which respectively correspond to the manufacturing steps a through l as will be described hereinafter.

(Step a): After thoroughly cleansing a soda lime glass plate a silicon oxide film was formed thereon to a thickness of 0.5 μm by sputtering to produce a substrate 1, on which Cr and Au were sequentially laid to thicknesses of 5 nm and 600 nm respectively by vacuum evaporation and then a photoresist (AZ1370: available from Hoechst Corporation) was applied thereto by means of a spinner, while rotating the film, and baked. Thereafter, a photo-mask image was exposed to light and developed to produce a resist pattern for lower wires 112 and then the deposited Au/Cr film was wet-etched to produce lower wires 112.

(Step b): A silicon oxide film was formed as an interlayer insulation layer 121 to a thickness of 1.0 μm by RF sputtering.

(Step c): A photoresist pattern was prepared for producing a contact hole 122 for each device in the silicon oxide film deposited in Step b, which contact hole 112 was then actually formed by etching the interlayer insulation layer 121, using the photoresist pattern for a mask. A technique of RIE (Reactive Ion Etching) using $CF_4$ and $H_2$ gas was employed for the etching operation.

(Step d): Thereafter, a pattern of photoresist was formed for a pair of device electrodes 2 and 3 of each device and a fissure L separating the electrodes and then Ti and Ni were sequentially deposited thereon respectively to thicknesses of 5 nm and 40 nm by vacuum deposition. The photoresist pattern was dissolved by an organic solvent and the Ni/Ti deposit film was treated by using a lift-off technique. Thereafter, each device was covered by photoresist except the device electrode 3 and Ni was deposited thereon to a thickness of 100 nm to make the device electrode 3 140 nm. The device electrodes 2 and 3 had a width W1 of 200 μm and were separated from each other by a distance L of 5 μm.

(Step e): After forming a photoresist pattern on the device electrodes 2 and 3 of the devices for upper wires 113, Ti and Au were sequentially deposited by vacuum deposition to respective thicknesses of 5 nm and 500 nm and then unnecessary areas were removed by means of a lift-off technique to produce upper wires 113 having a desired profile.

(Step f): Then, a Cr film was formed to a film thickness of 100 nm by vacuum deposition, using a mask having an opening on and around the fissure L between the device electrodes of each device, which Cr film was then subjected to a patterning operation. Thereafter, an organic Pd compound (ccp-4230: available from Okuno Pharmaceutical Co., Ltd.) was applied to the Cr film by means of a spinner, while rotating the film, and baked at 300° C. for 12 minutes. The formed electroconductive thin film 4 of each device was made of fine particles containing PdO as a principal ingredient and had a film thickness of 7 nm and an electric resistance per unit area of $2\times10^4$ Ω/□.

(Step g): A semi-polymerized produot 131 of furfuryl alcohol that had been prepared in advance was applied to each device to a thickness of 20 nm by means of a spinner and baked at 100° C. for thermosetting.

(Step h): The Cr film and the baked electroconductive thin film 4 of each device were wet-etched by using an acidic etchant to provide the electroconductive thin film 4 with a desired pattern.

(Step i): Then, resist was applied to the entire surface of the substrate except the contact holes 122, using a pattern, and Ti and Au were sequentially deposited by vacuum evaporation to respective thicknesses of 5 nm and 500 nm. Any unnecessary areas were removed by means of a lift-off technique to consequently bury the contact holes.

(Step j): The inside of the electron source was evacuated to $10^{-4}$ Pa and the devices on the substrate were subjected to energization forming in a manufacturing apparatus having a configuration same as the above described gauging system and provided with wires DXn and DYm for applying a voltage to each device. The conditions for the energization forming process were similar to those of Example 2.

(Step k): The devices were driven to operate by applying a voltage to them on a line by line basis for 12 minutes. Throughout the operation, the device current If was observed and the voltage application was stopped when the device current If per device got to 1.3 mA for each line.

(Step l): After Step k, the substrate was taken out of the manufacturing apparatus and baked at 420° C. for 20 minutes in a clean oven containing a mixture gas of $N_2$ and $O_2$ with a ratio of 80% to 20% to $10^{-1}$ Pa.

The completed electron source substrate was then tested for electron emission by means of a testing apparatus having a drive circuit as will be described hereinafter. For manufacturing an image-forming apparatus, an electron source substrate that has passed the test is moved to an assembling step to produce an image-forming apparatus as will be described hereinafter.

Then, a face plate was prepared. A face plate comprises a fluorescent film formed by arranging a set of fluorescent bodies on the inner surface of a glass substrate and a metal back. While the fluorescent film may comprise only a single fluorescent body if the display panel is used for showing black and white pictures, it needs to comprise for displaying color pictures black conductive members 121 and fluorescent bodies, of which the former are referred to as black stripes or members of a black matrix depending on the arrangement of the fluorescent bodies. Black stripes or members of a black matrix are arranged for a color display panel so that the fluorescent bodies of three different primary colors are made less discriminable and the adverse effect of reducing the contrast of displayed images of external light reflected by the fluorescent film is weakened by blackening the surrounding areas. While graphite is normally used as a principal ingredient of the black stripes, other conductive material having low light transmissivity and reflectivity may alternatively be used.

A precipitation or printing technique is suitably be used for applying a fluorescent material on the glass substrate regardless of black and white or color display. An ordinary metal back is arranged on the inner surface of the fluorescent film. The metal back is provided in order to enhance the luminance of the display panel by causing the rays of light emitted from the fluorescent bodies and directed to the inside of the envelope to turn back toward the face plate, to use it as an electrode for applying an accelerating voltage to electron beams and to protect the fluorescent bodies against damages that may be caused when negative ions generated inside the envelope collide with them. It is prepared by smoothing the inner surface of the fluorescent film (in an operation normally called "filming") and forming an Al film thereon by vacuum deposition after forming the fluorescent film.

In this example, a face plate carrying a stripe-shaped fluorescent film was formed.

Figure 14:
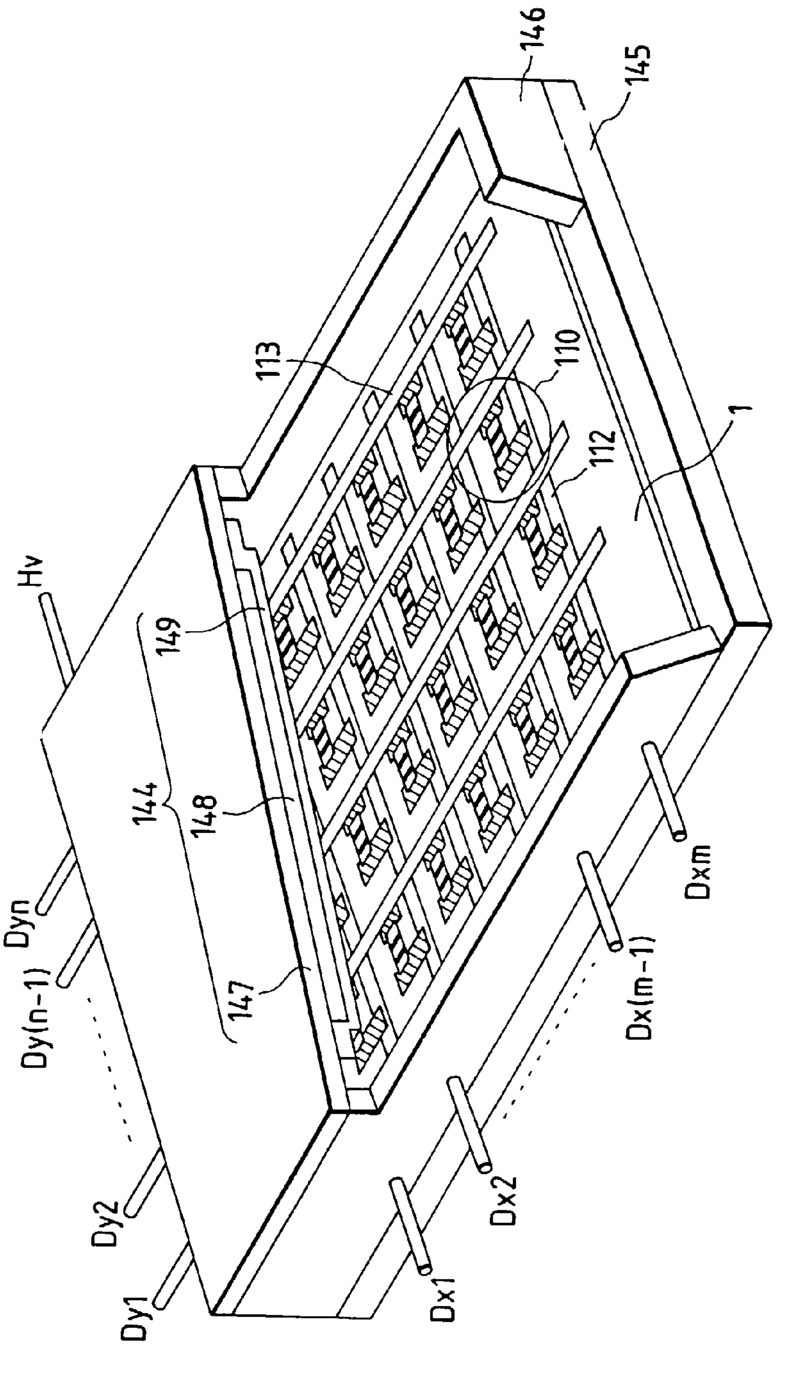
FIG. 14 is a partly cut away schematic perspective view of a display panel that can be used for an image-forming apparatus according to the invention.

Then, the electron source substrate and the face plate prepared in the above described manner were combined to produce an image-forming apparatus as shown in FIG. 14.

In FIG. 14, reference numeral 110 denotes an electron-emitting device and numerals 112 and 113 denote respectively an X-directinal wire and a Y-directional wire for electron-emitting devices.

After rigidly securing the substrate 1 carrying a large number of surface conduction electron-emitting devices onto a rear plate 141, the face plate 144 (comprising a fluorescent film 148 formed by arranging strip-shaped fluorescent bodies on the inner surface of a glass substrate 147 and a metal back 149) was arranged 5 mm above the substrate 1 with a support frame 146 disposed therebetween and frit glass was applied to the bonding areas of the face plate 144, the support frame 146 and the rear plate 145. Then, the fluorescent bodies of the three primary colors were arranged vis-a-vis the respective electron-emitting devices to accurate alignment and baked at 400° C. for 15 minutes in the atmosphere to securely bond them together. While the envelope was formed of the face plate 144, the support frame 146 and the rear plate 145 in the above description, the rear plate 145 may be omitted if the substrate 1 is strong enough by itself because the rear plate 145 is provided mainly for reinforcing the substrate 1. If such is the case, an independent rear plate 145 may not be required and the substrate 1 may be directly bonded to the support frame 146 so that the envelope is constituted of a face plate 144, a support frame 146 and a substrate 1. On the other hand, the overall strength of the envelope may be increased by arranging a number of support members called spacers (not shown) between the face plate 144 and the rear plate 145.

The envelope or the glass container was evacuated through an exhaust pipe (not shown) by means of a vacuum pump until the atmosphere in the inside was reduced to a degree of vacuum of $10^{-5}$ Pa and heated to 150° C. for 2 hours in order to remove the water, oxygen, CO, $CO_2$, hydrogen and other substances contained in the container, which container was thereafter hermetically sealed. Then, the container was subjected to a getter process using a high frequency heating technique in order to maintain the achieved degree of vacuum in the inside of the envelope after it was sealed. Since the stabilization process of this example was aimed at removing water, oxygen, CO, $CO_2$ and hydrogen that can be removed at low temperature, the glass container was baked at low temperature for a very short period of time.

Now, a drive circuits for driving a display panel comprising an electron source with a simple matrix arrangement for displaying television images according to NTSC television signals will be described by referring to FIG. 15.

Figure 15:
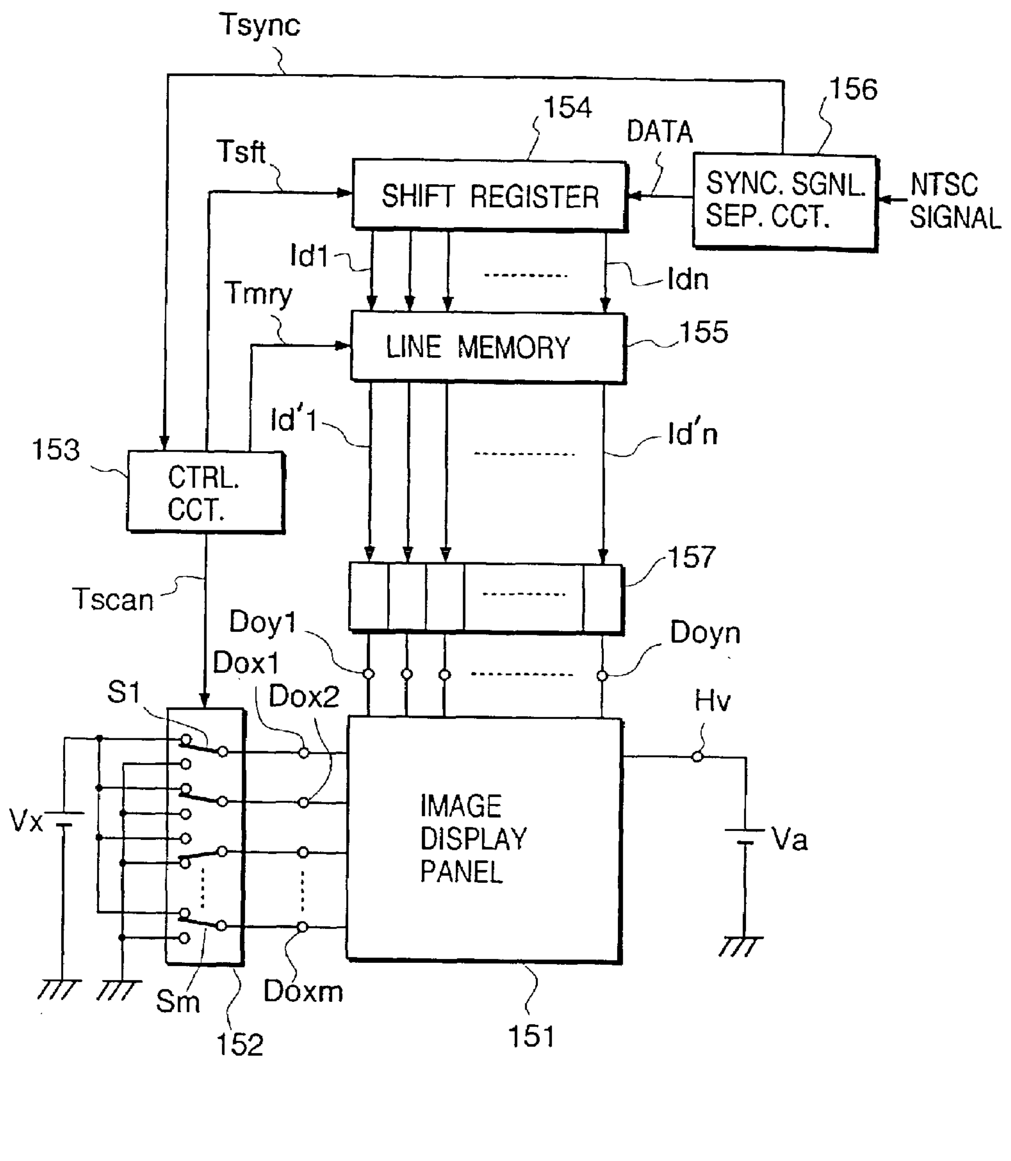
FIG. 15 is a circuit diagram of a drive circuit that can be used to drive an image-forming apparatus manufactured by a method according to the invention and adapted to television signals of the NTSC system.

In FIG. 15, reference numeral 151 denotes an image-forming apparatus. Otherwise, the circuit comprises a scan circuit 152, a control circuit 153, a shift register 154, a line memory 155, a synchronizing signal separation circuit 156 and a modulation signal generator 157. Vx and Va in FIG. 15 denote DC voltage sources.

The image-forming apparatus 151 is connected to external circuits via terminals Dox1 through Doxm, Doy1 through Doym and high voltage terminal Hv, of which terminals Dox1 through Doxm are designed to receive scan signals for sequentially driving on a one-by-one basis the rows (of N devices) of an electron source in the apparatus comprising a number of surface-conduction type electron-emitting devices arranged in the form of a matrix having M rows and N columns.

On the other hand, terminals Doy1 through Doyn are designed to receive a modulation signal for controlling the output electron beam of each of the surface-conduction type electron-emitting devices of a row selected by a scan signal. High voltage terminal Hv is fed by the DC voltage source Va with a DC voltage of a level typically around 10 kV, which is sufficiently high to energize the fluorescent bodies of the selected surface-conduction type electron-emitting devices.

The scan circuit 152 operates in a manner as follows. The circuit comprises M switching devices (of which only devices S1 and Sm are specifically indicated in FIG. 15), each of which takes either the output voltage of the DC voltage source Vx or 0V (the ground potential level) and comes to be connected with one of the terminals Dox1 through Doxm of the display panel 151. Each of the switching devices S1 through Sm operates in accordance with control signal Tscan fed from the control circuit 153 and can be prepared by combining transistors such as FETs.

The DC voltage source Vx is designed to apply a constant voltage to the unscanned electron-emitting devices of the image-forming apparatus in order to make the drive voltage applied to the unscanned devices fall under the threshold voltage for electron emission.

The control circuit 153 coordinates the operations of related components so that images may be appropriately displayed in accordance with externally fed video signals. It generates control signals Tscan, Tsft and Tmry in response to synchronizing signal Tsync fed from the synchronizing signal separation circuit 156, which will be described below.

The synchronizing signal separation circuit 156 separates the synchronizing signal component and the luminance signal component from an externally fed NTSC television signal and can be easily realized using a popularly known frequency separation (filter) circuit. Although a synchronizing signal extracted from a television signal by the synchronizing signal separation circuit 156 is constituted, as well known, of a vertical synchronizing signal and a horizontal synchronizing signal, it is simply designated as Tsync signal here for convenience sake, disregarding its component signals. On the other hand, a luminance signal drawn from a television signal, which is fed to the shift register 154, is designed as DATA signal.

The shift register 154 carries out for each line a serial/parallel conversion on DATA signals that are serially fed on a time series basis in accordance with control signal Tsft fed from the control circuit 153. (In other words, a control signal Tsft operates as a shift clock for the shift register 154). A set of data for a line that have undergone a serial/parallel conversion (and correspond to a set of drive data for n electron-emitting devices) are sent out of the shift register 154 as n parallel signals Id1 through Idn.

The line memory 155 is a memory for storing a set of data for a line, which are signals Id1 through Idn, for a required period of time according to control signal Tmry coming from the control circuit 153. The stored data are sent out as I'dl through I'dn and fed to modulation signal generator 157.

Said modulation signal generator 157 is in fact a signal source that appropriately drives and modulates the operation of each of the surface-conduction type electron-emitting devices and output signals of this device are fed to the surface-conduction type electron-emitting devices in the display panel 151 via terminals Doy1 through Doyn.

The above arrangement is adapted to pulse width modulation. With pulse width modulation, a pulse width modulation type circuit is used for the modulation signal generator 157 so that the pulse width of the applied voltage may be modulated according to input data.

Although it is not particularly mentioned above, the shift register 154 and the line memory 155 may be either of digital or of analog signal type so long as serial/parallel conversions and storage of video signals are conducted at a given rate.

With an image forming apparatus comprising a display panel and a drive circuit having a configuration as described above, to which the present invention is applicable, the electron-emitting devices emit electrons as a voltage is applied thereto by way of the external terminals Dox1 through Doxm and Doy1 through Doyn. Then, the generated electron beams are accelerated by applying a high voltage to the metal back 149 or a transparent electrode (not shown) by way of the high voltage terminal Hv. The accelerated electrons eventually collide with the fluorescent film 148, which by turn emits light to produce images.

When NTSC television signals are applied to the image-forming apparatus prepared in this example, it displayed clear television images.

EXAMPLE 8

Figure 16:
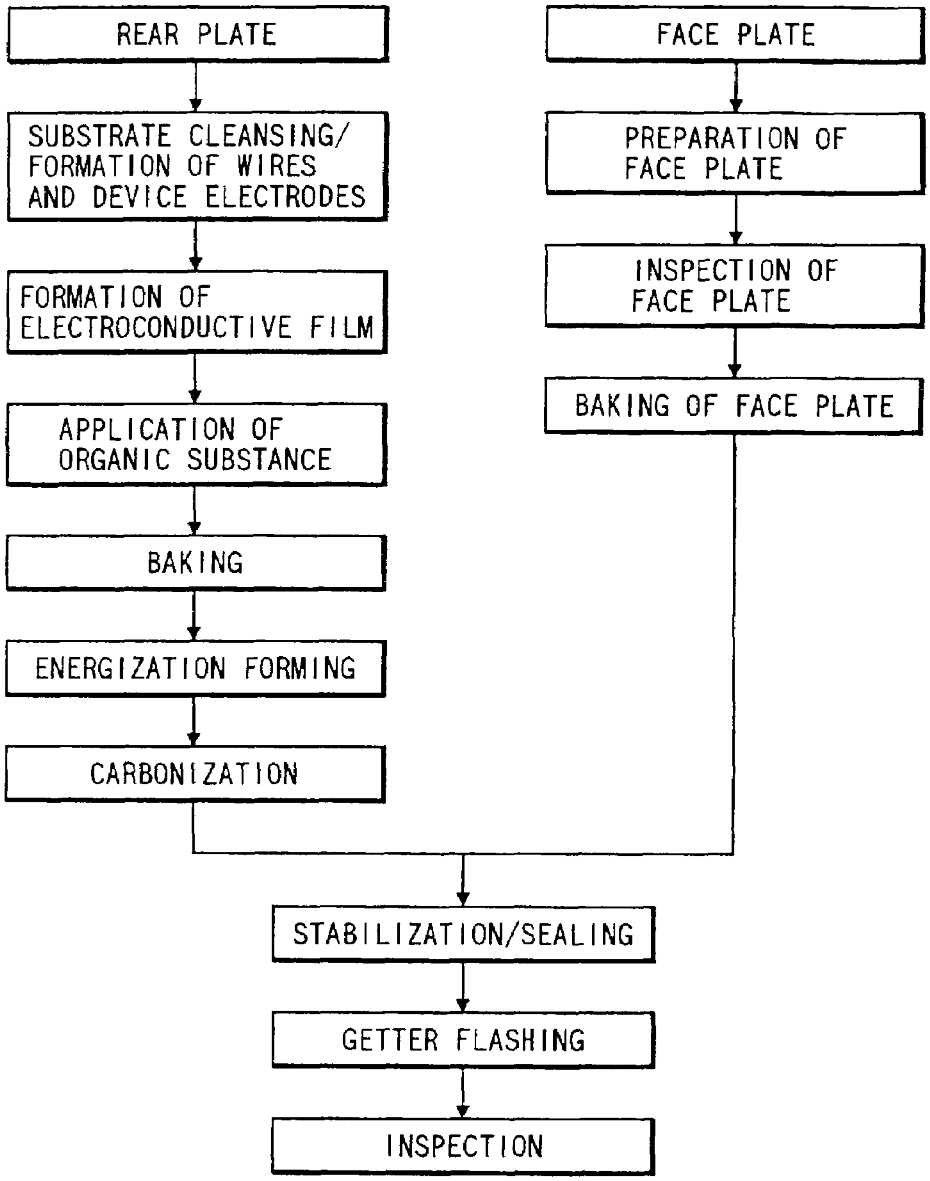
FIG. 16 is a flow chart of a method of manufacturing an image-forming apparatus according to the invention in the mode of carrying it out used in Example 8.
Figure 17:
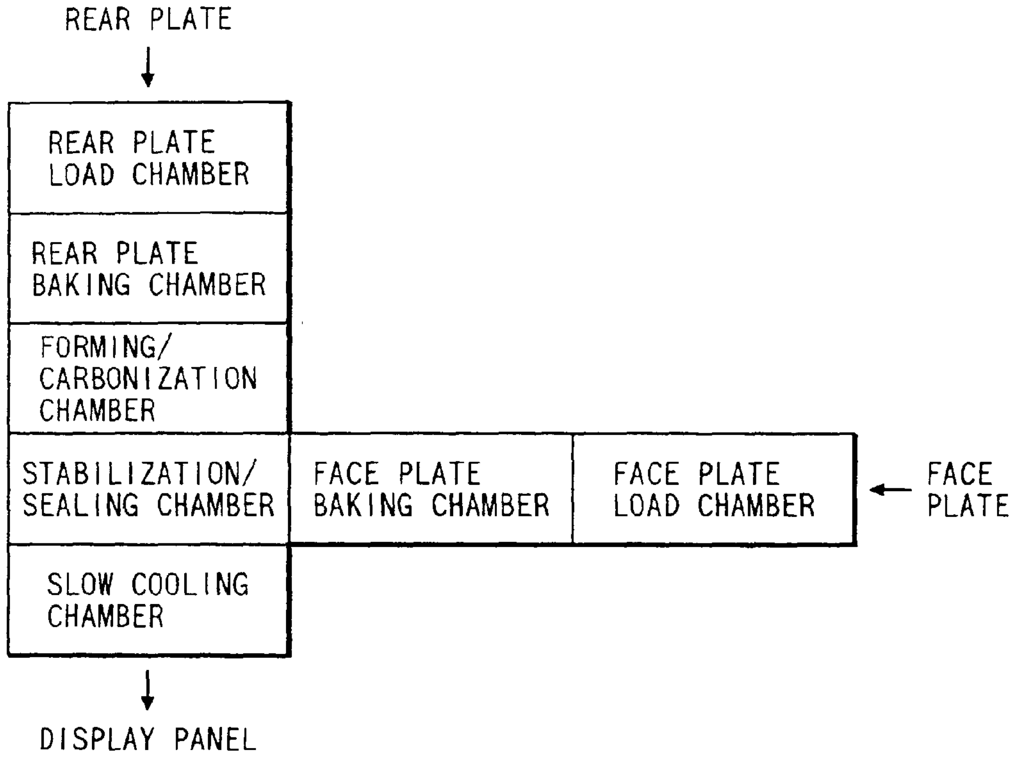
FIG. 17 is a schematic block diagram of the apparatus used for preparing the image-forming apparatus in Example 8.

In this example, a display panel was prepared by a method of manufacturing an image-forming apparatus according to the invention. In this example, the electron source substrate operated as a rear plate. This example will be described below by referring to the flow chart of FIG. 16 and a schematic illustration of the apparatus for manufacturing an image-forming apparatus shown in FIG. 17.

Firstly the manufacturing apparatus will be described.

The apparatus for manufacturing a display panel used in this examples comprises a number of load-lock type vacuum chambers. Basically, it comprises a rear plate load chamber, a rear plate baking chamber, a forming/carbonization chamber, a stabilization/sealing chamber, a face plate load chamber, a face plate baking chamber and a slow cooling chamber. The chambers are separated from each other by partitions so that the vacuum condition of each chamber may be controlled independently. The substrate discharged from a chamber is automatically transferred to the succeeding chamber. A rear plate is received by the rear plate load chamber for processing and discharged from the stabilization chamber after completing the necessary processes. On the other hand, a face plate is received by the face plate load chamber, passes through the face plate baking chamber and then brought into the sealing chamber, where it is combined with a rear plate discharged from the stabilization chamber. The container produced by combining the face and rear plates is then moved to the slow cooling chamber, where it is cooled to room temperature. Each chamber is provided with an exhaust system comprising an oil free vacuum pump. The forming/carbonization chamber and the stabilization chamber are adapted not only to electrically processing operations but also to electric tests. The stabilization/sealing chamber are so arranged that gas can be fed into them for a stabilization process.

Now, the method used for manufacturing the display panel of this example will be described.

(Preparation of Face Plate)

(Step 1) (Preparation and Test of Face Plate)

The face plate of the image-forming apparatus was prepared as in Example 7 and then tested. Firstly the support frame of the display panel was bonded to the face plate along the periphery thereof by means of frit glass. A sheet frit was arranged to the area of the support frame to be bonded to the rear plate. After (Step 1), the face plate was entered into the load chamber of FIG. 17, which was designed to store a plurality of face plates in vacuum.

(Step 2) (Baking of Face Plate) Then, the face plate was baked in vacuum at 400° C. for 10 minutes in order to remove the water, oxygen, CO and $CO_2$ that have been adsorbed by the face plate. The temperature of 400° C. was selected to make it agree with the temperature of the rear plate in (Step 6). The face plate baking chamber showed a degree of vacuum of $1\times10^{-5}$ Pa.

(Step 3) (Preparation of Rear Plate (Electron Source Substrate in this example) Same as Steps (a) through (i) of Example 7.

In this step, an electroconductive film was formed on each of a plurality of electron-emitting devices on the substrate and then wires were arranged for the devices into a simple matrix arrangement. Then, an organic substance was applied to the substrate to form a layer. After (Step 3), the rear plate was entered into the load chamber of FIG. 17, which was designed to store a plurality of rear plates in vacuum. (Step 4) (Baking of Rear Plate) Then, the rear plate was baked in vacuum at 200° C. for 1 hour in order to remove the water, oxygen, CO and $CO_2$ that have been adsorbed by the rear plate. The rear plate baking chamber showed a degree of vacuum of $1\times10^{-5}$ Pa.

(Step 5) (Energization Forming/Carbonization Process) An energization forming process was conducted in a manner as described in Example 7. Then, the layered organic substance was carbonized in the same chamber. The entire substrate was heated to 200° C. After the carbonization process, each electron-emitting device was tested for the device current to check the electron source substrate.

(Step 6) (Stabilization Process/Sealing) In this stabilization process, a 1:4 mixture gas of oxygen and $N_2$ was introduced into the chamber at 1 Pa and heated at 400° C. for 10 minutes, which temperature was maintained for some time thereafter. Then, the face plate coming out from (Step 2) was introduced into the (stabilization/sealing chamber) and aligned and bonded with the rear plate under pressure. Although the introduced gas was held in the envelope after the sealing operation in order to remove the binder remaining in the frit glass, it was eliminated thereafter. The envelope was sealed when the internal pressure of the chamber got to a pressure level of $10^{-7}$ Pa (Step 7) (Slow Cooling Process) The display panel produced from Step 6 was slowly cooled to room temperature and then removed from the slow cooling chamber.

(Step 8) The getter arranged in the display panel was made to flash in order to maintain the obtained degree of vacuum inside the display panel.

(Step 9) The prepared display panel was electrically tested.

(Step 10) As the display panel operated well in Step 9, the drive circuit of Example 7 and other components were fitted to it to produce a complete image-forming apparatus.

The image-forming apparatus was driven to operate as in Example 7 to see that it displayed clear images.

As described in detail above, a method of manufacturing an electron-emitting device according to the invention includes an activation process comprising steps of applying an organic substance carbonizing the organic substance to produce surface conduction electron-emitting devices that operate excellently for electron emission at low cost in a simple manner. High quality carbon can be formed for the electron-emitting devices by using catalytic metal.

Additionally, a stabilization step for heating the device follows the activation step and is conducted in reactive gas to exploit the difference in the ability of withstanding the reactive gas between the intermediary product and the carbonized substance produced in the activation process so that the intermediary product can be removed easily at low temperature and the electron-emitting performance significantly improved by the activation process is preserved. Thus, the problems inherent in the known stabilization process as pointed out earlier are eliminated to effectively suppress any electric discharge and stabilize the electron-emitting performance of the device.

Therefore, an electron source comprising a plurality of such electron-emitting devices and an image-forming apparatus incorporating such an electron source are produced through an activation process that is controllable much easier than its counterpart of any known methods to minimize the deviation in the performance of the electron source and that of the image-forming apparatus.

With a method of manufacturing an image-forming apparatus according to the invention and comprising steps of preparing an electron source substrate, testing it, preparing a face plate, testing it and combining the electron source substrate and the face plate carrying thereon an image-forming member to produce a vacuum envelope, only a good electron source and a good face plate are combined to eliminate the possibility of producing a defective image-forming apparatus and consequently reduce the overall cost of manufacturing image-forming apparatus on a mass production basis. Additionally, since the intermediary product produced in the activation process is removed from the electron source substrate, the step of combining the electron source substrate and the face plate carrying thereon a fluorescent body into an envelope and sealing it can be mostly dedicated to remove water, oxygen, hydrogen, CO and $CO_2$ to further reduce the manufacturing cost.

Finally, if a manufacturing apparatus that can manufacture an image-forming apparatus without exposing it to the atmosphere through the manufacturing steps is used, the water, oxygen, hydrogen, CO and $CO_2$ that are removed from the apparatus are prevented from being re-adsorbed by the components of the apparatus to ensure a stable operation of the image-forming apparatus and a high yield of manufacturing such image-forming apparatus.

What is claimed is:

1. A method of making an electron-emitting device comprising the steps of:

(A) preparing electrodes on a substrate and an electro-conductive film bridging the electrodes;

(B) producing a fissure in the electro-conductive film by energization forming, by applying voltage to the electrodes;

(C) preparing a film of an organic substance onto the electro-conductive film in which the fissure is formed, by applying a liquid with an organic substance being dissolved onto the electro-conductive film in which the fissure is formed; and (D) carbonizing the film of the organic substance by applying a voltage to the electrodes.

2. A method of making an electron source, the method comprising providing a plurality of electron-emitting devices on a substrate, wherein each of the electron-emitting devices is made by the method according to claim 1.

3. A method of making an image display device, the method comprising providing an electron source and an another substrate having a fluorescent film, wherein the electron source is made by the method according to claim 2.

4. A method of making an electron-emitting Device comprising the steps of:

(A) preparing electrodes on a substrate, an electro-conductive film bridging the electrodes and a film of an organic substance, the film of the organic substance being formed by applying a liquid with an organic substance being dissolved onto the electro-conductive film; and (B) producing a fissure in the electro-conductive film by energization forming, by applying a voltage to the electrodes; and (C) carbonizing the film of the organic substance by applying a voltage to the electrodes.

5. A method of making electron source comprising a plurality of electron-emitting devices, wherein the electron-emitting devices are each made by the method according to claim 4.

6. A method of making an image display device comprising an electron source and another substrate having a fluorescent film, wherein the electron source is made by the method according to claim 5.

* * * * *